United States Patent [19]
Peercy et al.

[11] Patent Number: 5,710,876
[45] Date of Patent: Jan. 20, 1998

[54] COMPUTER GRAPHICS SYSTEM FOR RENDERING IMAGES USING FULL SPECTRAL ILLUMINATION DATA

[75] Inventors: Mark S. Peercy, Sunnyvale; Daniel R. Baum, Palo Alto, both of Calif.

[73] Assignee: Silicon Graphics, Inc., Mountain View, Calif.

[21] Appl. No.: 450,619

[22] Filed: May 25, 1995

[51] Int. Cl.$^6$ ................................................ G06T 15/50
[52] U.S. Cl. ........................................ 395/126; 395/130
[58] Field of Search .................................. 395/119, 126, 395/130–1

[56] References Cited

PUBLICATIONS

Lee, Hsien–Che, "Modeling Light Reflection for Computing Color Vision", *IEEE Transactions on Pattern Analysis &Machine Intelligence*, Apr. 1990, pp. 402–409.

Nayar, et al, "Removal of Specularities Using Color and Polarization", *Computer vision and Pattern Recognition*, 1993, pp. 583–590.

Kleiman, "XYZ Technology", *Instruments and Measurement Technology Conference*, 1992, pp. 84–89.

Foley, et al., "Computer Graphics: Principles and Practice", *Addison–Wesley Publishing Company*, 1990, Chapter 16, pp. 741–745.

Foley, et al., "Computer Graphics: Principles and Practice", *Addison–Wesley Publishing Company*, 1990, Chapter 1, Introduction, pp. 1–23.

Glassner, A., "How to Derive a Spectrum from an RGB Triplet", *IEEE Computer Graphics and Applications*, Jul. 1989, pp. 95–99.

Peercy, "Linear Color Representations for Full Spectral Rendering", *Computer Graphics Proceedings, Annual Conference Series*, Aug. 1993, pp. 191–198.

Schreiber, W.F., "Fundamentals of Electronic Imaging Systems", *Springer–Verlag*, 1991, Chapter 7, pp. 168–207.

Wandell, B.A., "The Synthesis and Analysis of Color Images", *IEEE Transactions on Pattern Analysis and Machine Intelligence*, vol. PAMI–9, No. 1, Jan. 1987, pp. 2–13.

Segal, M., The OpenGL™ Graphics System, Version 1.0, Dec. 28, 1993.

Peercy, et al., "Interactive Full Spectral Rendering", *Proceeding 1995 Symposium on Interactive 3–D Graphics*, Apr. 9–12, 1995.

*Primary Examiner*—Heather R. Herndon
*Assistant Examiner*—Rudolph Buchel
*Attorney, Agent, or Firm*—Blakely, Sokoloff, Taylor & Zafman

[57] ABSTRACT

A computer controlled graphics system for processing an image using full spectral representations. An object in an image has an associated full spectral surface reflectance function. Each illumination source is represented by a light vector whose components represent the weights of predetermined basis functions, so that said illumination vector represents a light source in full spectral representation. A plurality of sensors each has an associated sensor response function. A user may select, either directly or indirectly such as through a graphics program, the surface reflectance function, each light source, and the sensor response functions. At a point on an object, the color processing system determines a surface matrix responsive to the surface reflectance function at said point, the plurality of predetermined basis functions, and the plurality of sensor response functions. Responsive to the surface matrix and each illumination vector the color processing system uses a matrix multiplication circuit to determine a set of colorimetric sensor values for the point. A user may also select a texture and/or an environment map. The texture map may comprise a surface matrix at each texel, and can be used as a substitute for the surface matrix or alternately it can be used for texturing the set of colorimetric sensor values calculated from the surface matrix. The environment map may comprise an environment map vector at each location within the map, which can be used to provide the illumination vector.

29 Claims, 23 Drawing Sheets

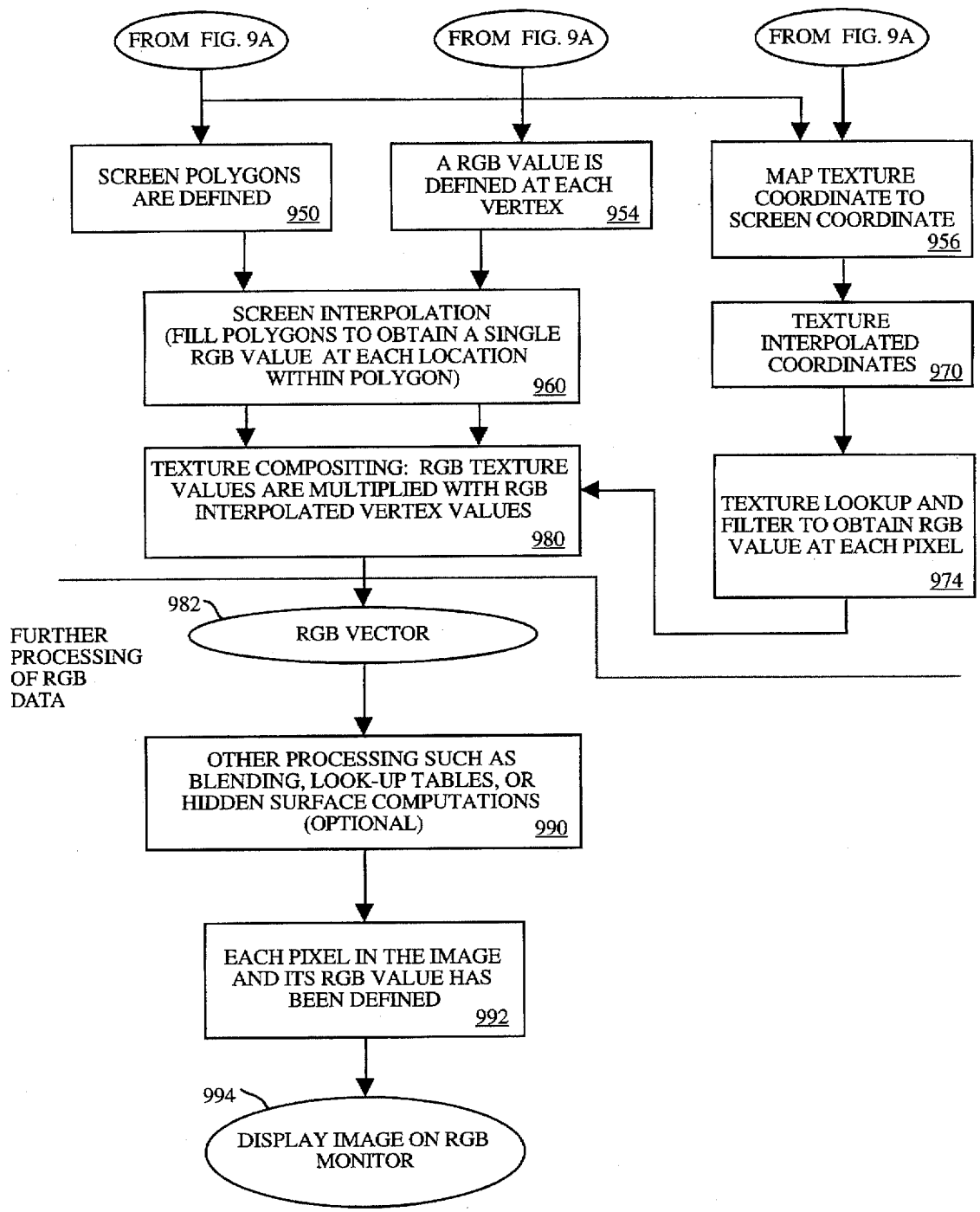

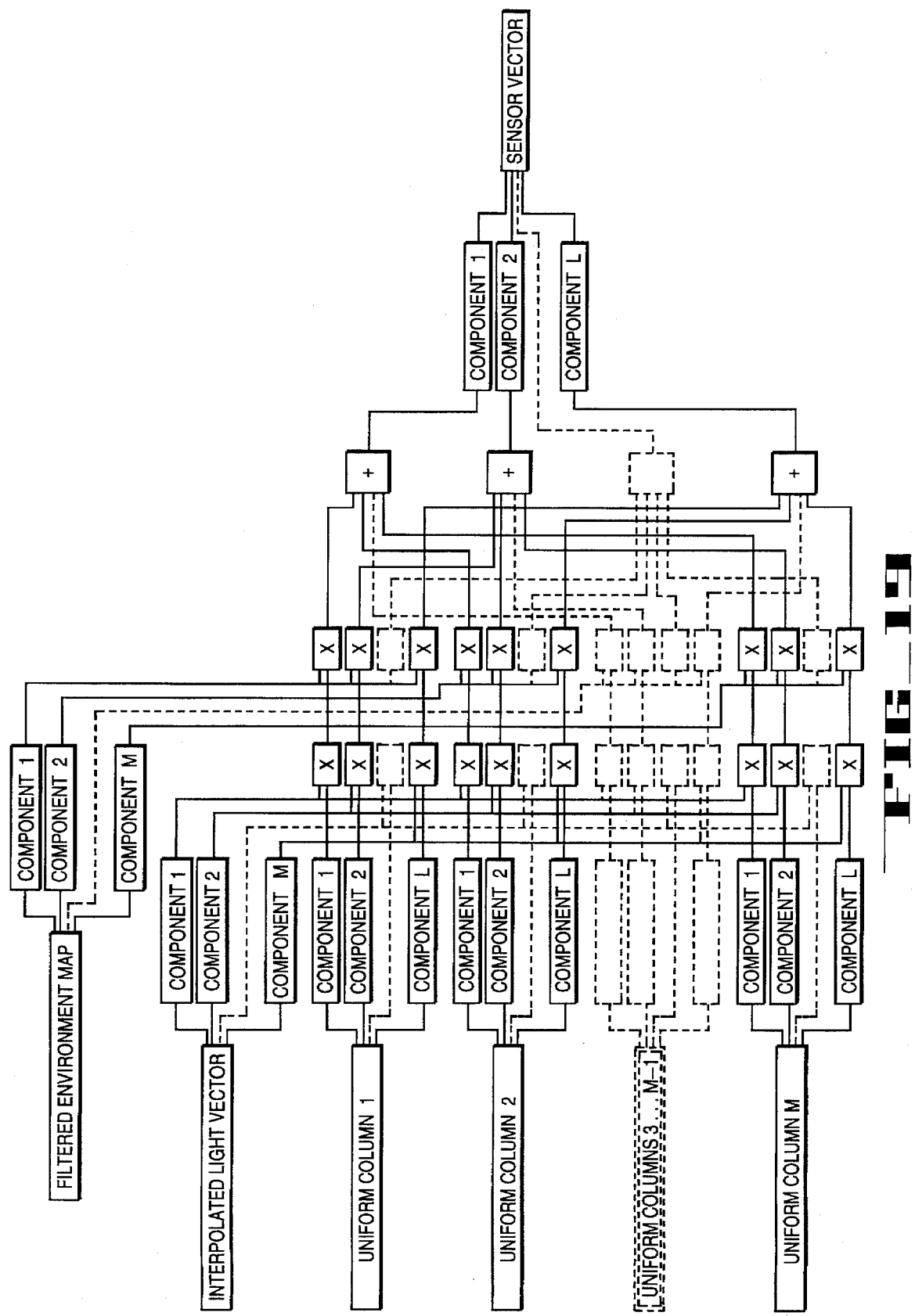

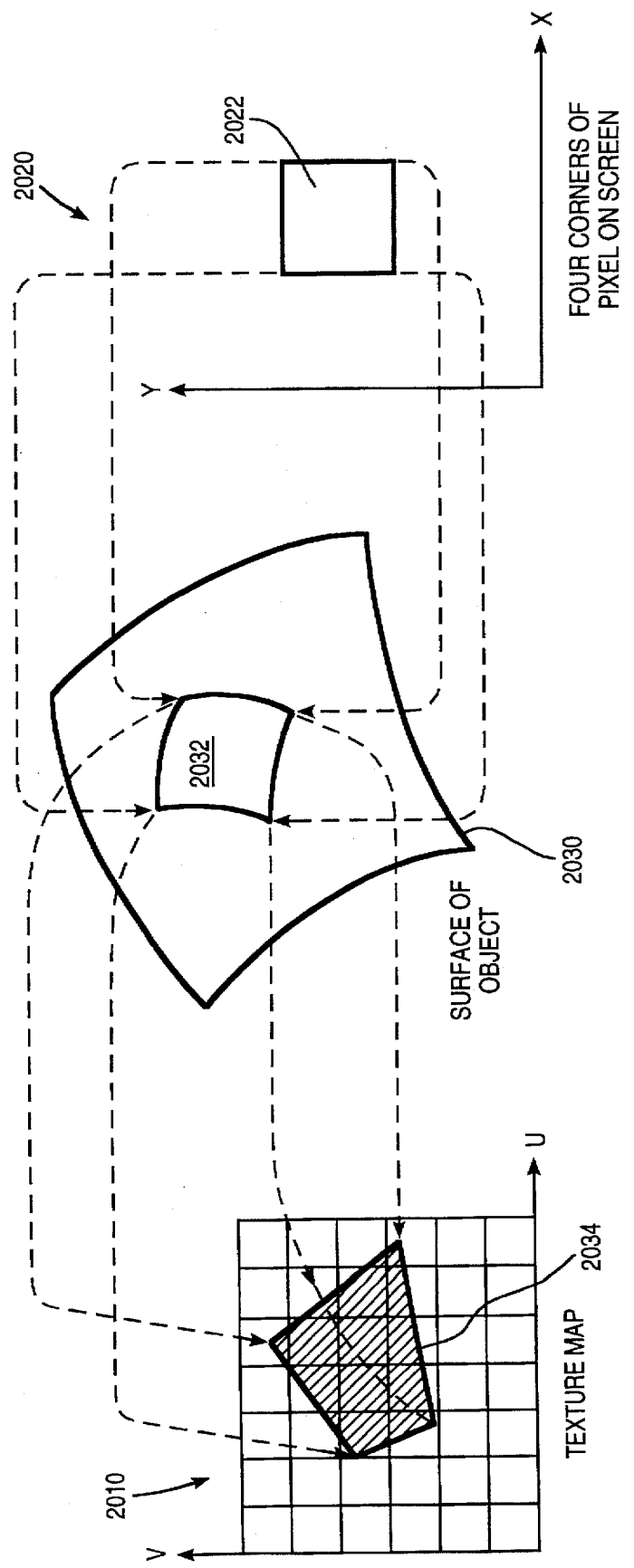
FIG_20 (PRIOR ART)

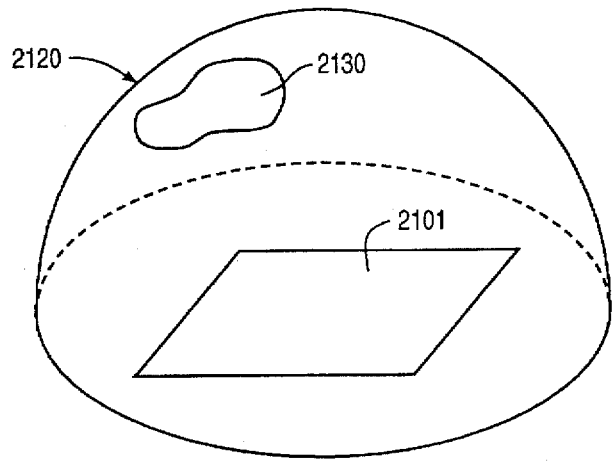
FIG_21
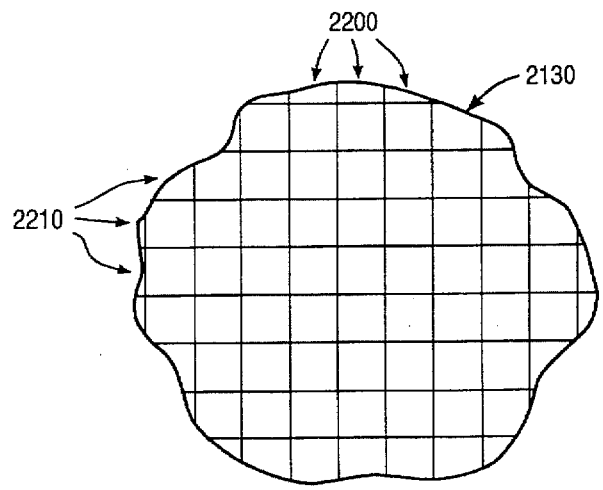
FIG_22
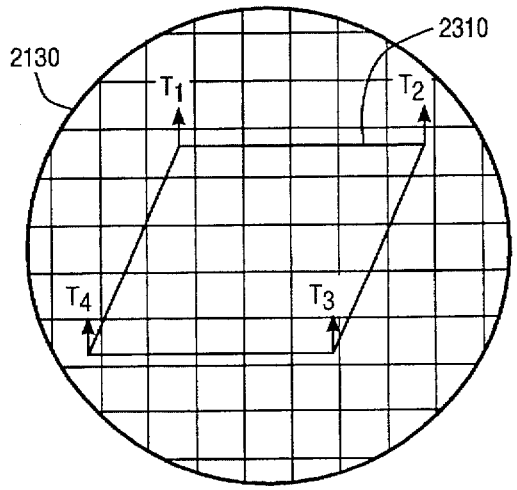
FIG_23

COMPUTER GRAPHICS SYSTEM FOR RENDERING IMAGES USING FULL SPECTRAL ILLUMINATION DATA

This invention was made with U.S. Government support under National Science Foundation Grant No. ECS9215145. Pursuant to the terms therein, the U.S. Government has certain rights in the invention.

BACKGROUND OF THE INVENTION

1. Field of the Invention

The present invention relates to hardware-accelerated computer graphics systems including color rendering systems that perform illumination calculations for image synthesis including vertex illumination, texturing, or environment mapping.

2. Description of Related Art

The field of computer graphics relates to computer-generated displays of information and images. Until the early 1980s, the field of computer graphics was a very specialized field due in large part to expensive hardware and lack of easy-to-use and cost effective graphics-based application programs. Over the past decade, the reduced cost of hardware and the increasing availability of sophisticated application programs using bitmap graphics have enabled millions of new users to effectively utilize computers.

Today, computer graphics is largely interactive: the user controls the content, structure, and appearance of objects and their displayed images by using input devices, such as keyboards, mouses, or touch-sensitive screens. Application graphics programs control user interfaces and perform graphics processing functions including image synthesis. Such graphics programs include lighting and illumination. During graphics processing, special hardware (if available) may be called upon to quickly perform calculation-intensive operations. Hardware for interactive computer-user applications can be complex even for relatively simple graphics systems that process concrete "real world" objects. For interactive computer graphics systems utilized to produce pictures of abstract, synthetic objects in animations, the hardware can be very complex.

Color reproduction is one important aspect of image synthesis. For many implementations, a large part of the effectiveness of computer image synthesis depends on how accurately color can be reproduced. For example, the success of application programs for architectural and interior design, product styling and design, and visual simulation can depend in large part upon color rendition to accurately reproduce the appearance of each object in the image as it would appear in the real world. If color information is rendered inaccurately, usefulness of the computer simulation may be severely limited. Accuracy is particularly important in merging computer-generated imagery with still photographs or live action film: accurate color rendition simplifies merging of objects into the actual photographs or live action film.

Typically, existing implementations use the RGB model during illumination, like most software rendering systems. The RGB model defines each light source and object by a combination of three basic values—red, green and blue. Light sources and objects in a scene are described by the RGB values appropriate when displayed on a predetermined monitor.

In a typical RGB rendering system, scattered light from a surface is defined by the products of the red, green, and blue values of both the light and the surface. The resultant product RGB values are then directly displayed on the monitor. Unfortunately, the RGB model introduces inaccuracies during color rendering: much of the spectral information in the scene is lost by performing intermediate color and lighting calculations with the RGB model. Accordingly, the resulting image frequently appears substantially inferior to an analogous image rendered with full spectral information. Furthermore, fluorescence of an object (i.e., emission of light in response to light) is difficult if not impossible to implement using the RGB model. In summary, the RGB model only approximates the wide variation of spectral power distribution and surface-scattering properties present in the real world.

Another disadvantage of the RGB model arises because the RGB values are highly dependent upon the choice of color monitor: RGB data designed for a first monitor and system may not appear the same when used on a different system and/or with a different color monitor. Therefore, the RGB model causes difficulties in porting RGB databases of both objects and light illumination sources from system to system.

Despite the inaccuracies of the RGB color model, its use is wide-spread for at least two reasons. First, RGB color computations are relatively inexpensive in time and cost, a paramount consideration for hardware efficiency. Secondly, the standard introduced by the RGB model is difficult to change. Consequently, the benefits of full spectral rendering have remained inaccessible to computer graphics users, and particularly to interactive computer graphics users who could benefit from more accurate spectral rendering.

To accurately simulate color within a synthetic environment, the wavelength dependence of the spectral power distribution of light sources and of the reflectances and transmittances of objects must be preserved. Only when these properties are preserved will the light that passes to a viewer be converted into equivalent and accurate color values appropriate for final display on a monitor, printer, or other output device.

Some software rendering systems attempt to provide full spectral color information by point sampling multiple points across the spectrum. Using this very common technique the values of the spectral curves are taken only at fixed wavelength positions. Point sampling methods have been utilized to preserve full spectral information. As few as four samples may be adequate for some applications, but for general use, nine to twenty or more point samples should be employed. One example of multiple point sampling is given in a publication by R. Hall, *Illumination and Color in Computer Generated Imagery,* Springer, Berlin, 1989. To provide the large number of point samples necessary for high accuracy, such software rendering systems are exceedingly slow and completely unsuitable for use in an interactive graphics system.

A publication by Brian Wandell suggests expanding, over sets of orthonormal basis functions, the spectral power distributions of both 1) light sources and 2) surface reflectances of objects. (B. A. Wandell, "The Synthesis and Analysis of Color Images", *IEEE Transactions on Pattern Analysis and Machine Intelligence,* Vol. 9, No. 1, pp. 2–13, 1987) Because Wandell's approach uses separate sets of basis functions—one set for light sources and a second for surfaces—lengthy and extensive computations are required to implement it. As a result, Wandell's approach is not practical to implement in an interactive graphics system.

A publication by Mark Peercy suggests describing every spectral power distribution—including both the light sources and the scattered light in a scene—as a sum over orthonormal basis functions. (M. S. Peercy, "Linear Color Representations for Full Spectral Rendering", *Computer Graphics* (SIGGRAPH '93 Proceedings), Vol. 27, pp. 191–198, 1993). The representations used during rendering are designed to enable multiple scattering events, by transforming each reflection into a series of basis functions. However, this system is inefficient for single scattering events, which represent the large majority of rendering situations.

Although algorithms have been developed that reproduce full spectral color information, corresponding hardware implementations have not been developed, at least in part due to the lengthy and time-consuming calculations required to effectively implement such a system.

It would be an advantage to provide a practical color rendering system for computer graphics that has sufficient speed for interactive graphics, yet is portable between computers, and more accurately represents the objects in an image on a computer screen.

SUMMARY OF THE INVENTION

A hardware-accelerated, full spectral computer graphics rendering system that provides accurate and consistent color renditions for interactive graphics implementations is described herein. The rendering system performs processing operations including vertex lighting, texture mapping, and/or environment mapping in a full spectral format using full spectral data.

The full spectral rendering system receives user-supplied full spectral data relevant to specific material properties and light sources. The user may select the data directly or indirectly. For example, the user may specify, for an object, a particular color whose full spectral characteristics have been stored in memory. The user may select from a variety of known light sources such as incandescent illumination, whose spectral characteristics have been stored in memory. In some embodiments, the user can select the full spectral response of the sensors that will receive the color information from the rendering process. Examples of such sensors include the human visual system, a color camera, or an infrared camera.

Light (illumination) source data is supplied in the form of linear color representations in which each light source is represented by a weighted sum over one or more basis functions. Thus, within the rendering system, each source is defined by a source representation vector whose components specify the weights of basis functions. In memory, light (illumination) source data may be stored as a vector of predetermined basis functions.

A surface matrix is defined by sensor-basis vectors for each of the predetermined basis functions. The sensor-basis vectors are formulated for each basis function by integrating material data, color sensor data for each of the color sensors, and the basis function over wavelength. Thus, each color sensor has a separate term in the sensor-basis vector. Each sensor-basis vector gives the projection of its basis function scattered from the surface onto the sensors. Each sensor-basis vector defines one column (or row, depending upon implementation details) of the surface matrix. The other sensor-basis vectors are similarly computed for each of the other basis functions.

To accurately calculate reflection properties from a surface, the surface matrix is multiplied with the weighting vector for the light incident upon the surface. The surface could be described with multiple matrices to account for ambient reflection, diffuse reflection, specular reflection, and other properties, each of which is calculated before summing all of the color values for a final result.

In the rendering system, these full spectral calculations can be implemented in at least three places. First, they may be used for vertex lighting calculations, for which surface and light parameters are specified for polygonal objects. Second, they may be used for full spectral texturing. In some embodiments, multiple textures are active simultaneously and each texture stores a single column (or row, depending upon implementation details) of the surface matrix at each location. These columns (or rows) are weighted by the appropriate light coefficient before being summed together to complete the matrix multiplication. Third, they may be used for environment mapping, in which illumination from the environment is represented by light vectors stored in an image (the environment map). These light vectors in the environment map are multiplied at each point by a surface matrix associated with the object. The matrix may be interpolated from the vertices, or chosen to be uniform. A rendering system could also implement any combination of vertex illumination, texture mapping, and environment mapping, at user discretion.

Because full spectral data is used, the rendering system can provide similar colors even with different monitors and systems. In other words, use of full spectral data-which is more accurate than RGB data-provides more accurate and consistent display results. Furthermore, these pre-existing RGB databases are backwards compatible using known conversion techniques.

One advantage of the rendering system is more realistic color because by performing intermediate computations with full spectral information, the full amount of spectral data available for each object and each source is carried into the final result before it is translated into a form (such as RGB) usable by the sensors that will ultimately view the data.

The computation method and system described herein provides fast processing suitable for interactive systems. The color rendering system described herein can be implemented in the context of standard hardware-accelerated polygon rendering systems. Particularly, by using three basis functions and 3×3 surface matrices, the full spectral system is easily adaptable to present RGB computational systems.

This color rendering system described herein provides increased accuracy because the scattered light is not reprojected back onto the original basis functions, in contrast to systems in which full spectral color representations are computed for a global illumination case in which the scattered light may be used again in a subsequent scattering event.

BRIEF DESCRIPTION OF THE DRAWINGS

FIG. 9A and 9B show a flow chart illustrating operation of a prior art rendering system constructed according to the "Open GL" system requirements of Silicon Graphics.

FIG. 19 is a hardware implementation of the system shown in FIG. 18.

FIG. 20 is a diagram illustrating texture mapping.

FIG. 21 is a diagram illustrating environment mapping.

FIG. 22 is a section of the environment map of FIG. 21.

FIG. 23 is a map of the polygon of FIG. 21 within the environment map of FIG. 22.

DETAILED DESCRIPTION OF THE PREFERRED EMBODIMENT

A Conventional RGB Graphics Rendering System

Figure 1:
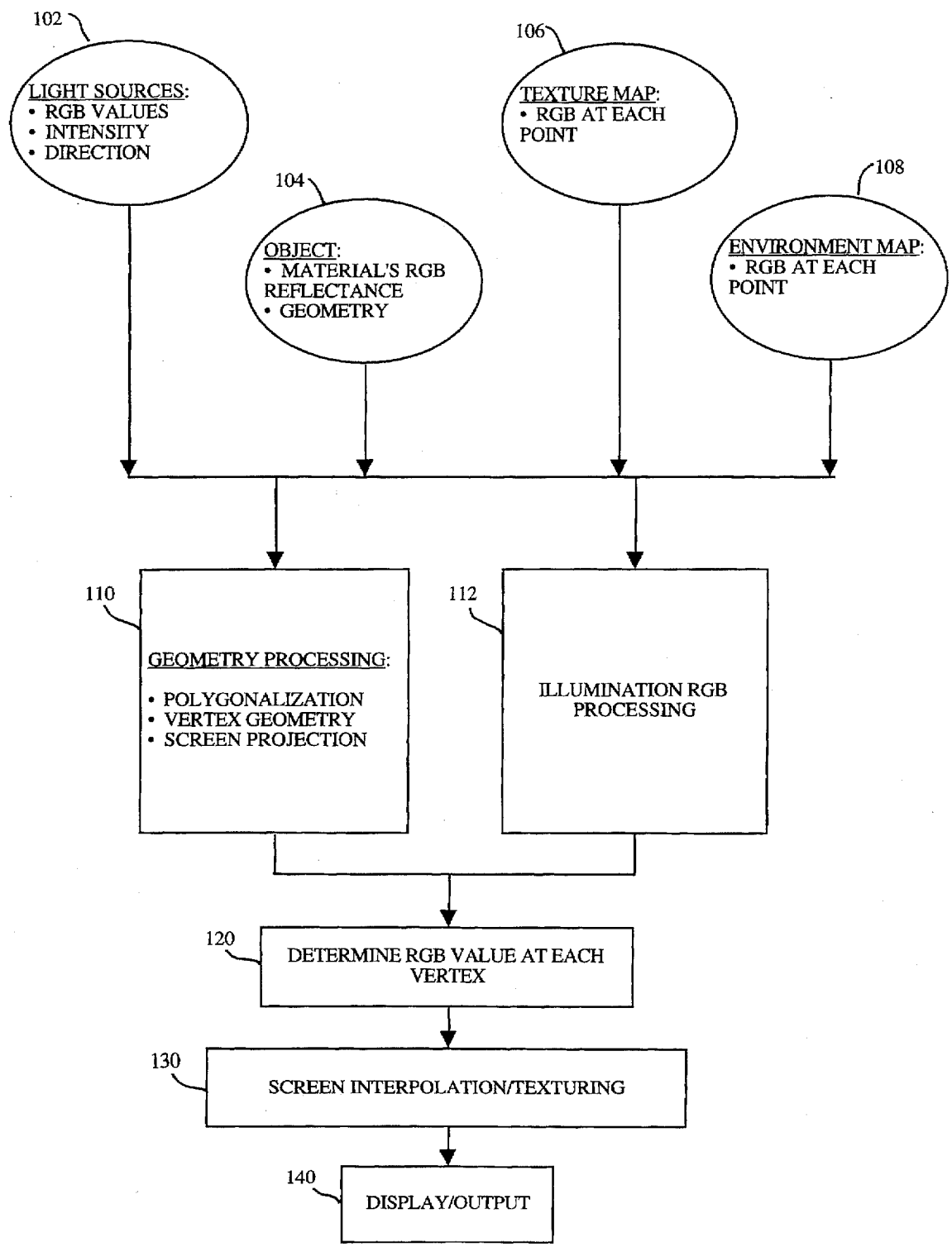
FIG. 1 is a flowchart illustrating a prior art RGB rendering system.

FIG. 1 is a diagram of a conventional graphics processing pipeline. The system accepts a user-supplied scene description 100 that may include RGB values for color processing. Conventionally, the color information has the form of RGB values. The scene description includes light sources 102 defined by RGB values, intensity, and direction, objects 104 defined by RGB reflectance, geometry, and optional texturing parameters 106 defined by an RGB value at each point in a texture. Additionally, an environment map 108 may be supplied as RGB at each point within the map.

The scene description is supplied to a rendering system having a geometry processing system 110 and an illumination processing system 112. In the geometry processing box 110, either at the user's discretion or internally, the objects are tessellated into polygons having a plurality of vertices each having associated material and texture parameters. The vertices are indexed in ordered vertex lists, and projected onto the screen. In the illumination processing system 112, the RGB light and RGB surface parameters are used to determine an output RGB value 120. For example, a vertex illumination model, with ambient, diffuse, and specular terms, may be used to determine an RGB value at a vertex. (R. Hall, *Illumination and Color in Computer Generated Imagery*, Springer, Berlin, 1989.)

The RGB vertex color values are linearly interpolated in a box 130 within the screen polygon to find RGB values of interior pixels. If a texture or environment map is used, the texture or environment coordinates are also interpolated within the polygon and used to index into a map including RGB information at each pixel. The RGB texture values are combined in various forms with the RGB vertex values to obtain a final RGB pixel value for further processing and/or display at 140.

Introduction to a Full Spectral Rendering System

Traditional hardware rendering systems such as shown in FIG. 1 employ the RGB model to provide color values at the vertices and during texturing and environment mapping. In comparison, rendering systems described herein can provide accurate full color computations for color values at the vertices and during texturing and environment mapping. Particularly, the rendering system described herein uses linear color representations to compute full spectral colors accurately.

Scene Description

Figure 2:
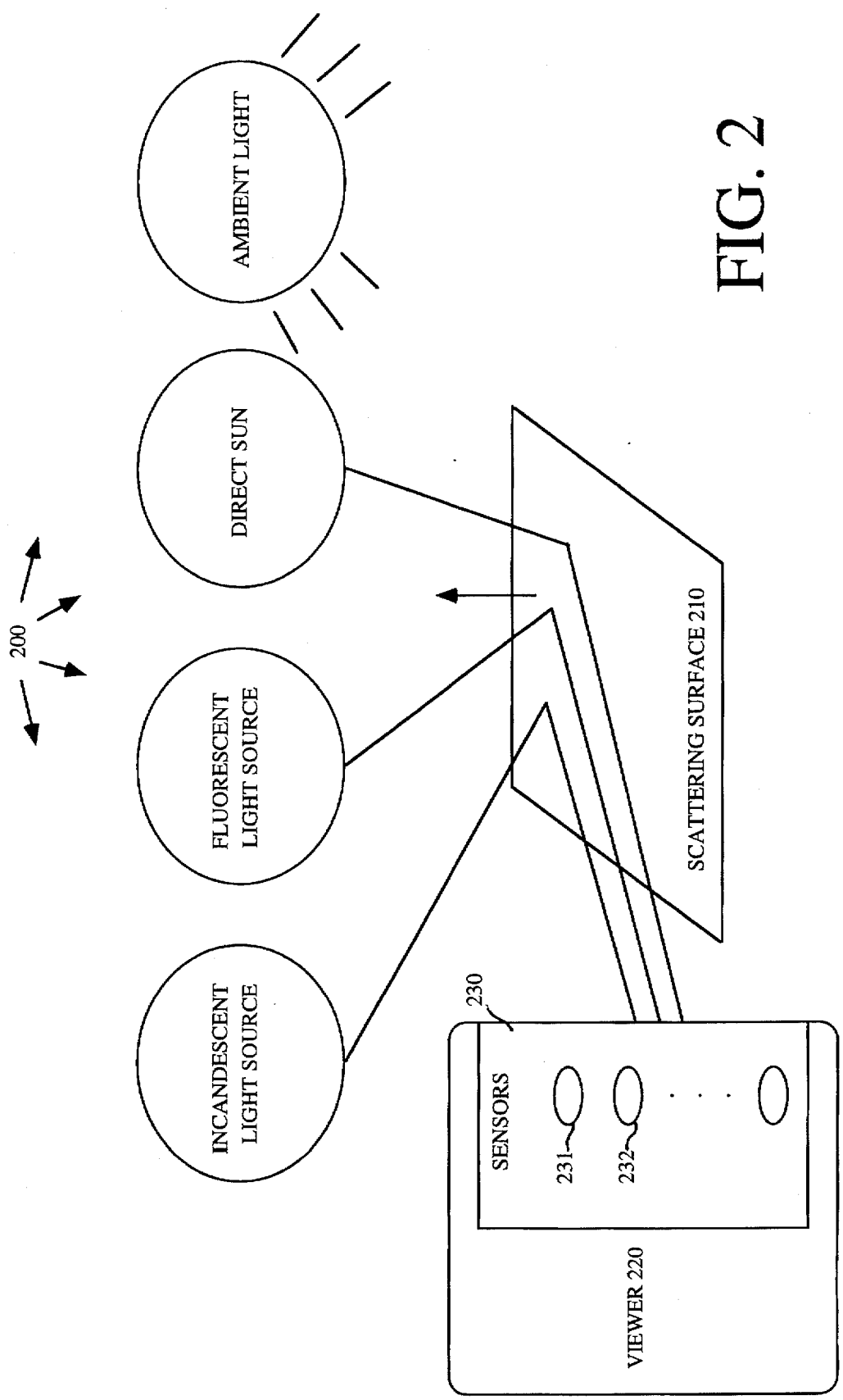
FIG. 2 is a diagram of a typical scene including light sources, a surface, and a viewer.

FIG. 2 depicts elements in a typical scene. A scene includes three distinct elements: light sources 200, a light scattering surface 210 (or other scattering matter), and a viewer 220 (a human or a camera for example). An incandescent light source, a fluorescent light source, direct sun, and ambient light are illustrated as light sources 200 in FIG. 2. The illustrated sources 200 have been selected for illustration because they represent common light sources. It should be apparent that any of a number of light sources could be utilized. For our representations, we assume the viewer 220 is linear or properly linearized, having sensors 230 of responsivity $R_k(\lambda)$ where (k=1, ..., L). Light from the sources 200 reflects off the surfaces 210 and toward the viewer 220, where it is detected by sensors 230.

Responses and Output of Sensors 230

Color representations described herein are based on the set of sensors 230 that will, either implicitly or explicitly, be used to capture the color information in a rendered scene. The system described herein enables the user to specify sensor characteristics that are used during color rendering operations to provide the desired interpretation of the final color values at each pixel. Therefore, the sensor data will be chosen dependent upon the eventual purpose of the rendered data.

The most common sensors are human eyes. Human visual response curves are characterized by standard color matching functions. Using these standard color matching curves to provide tristimulus values, a single conversion to a linearized RGB color monitor or a linearized CMY color printer can be applied to each surface matrix. These sensors are appropriate for direct display of the rendered image on a standard output device using techniques such as described in Hall, supra.

For merging computer graphics and synthetic imagery, the sensor values can be chosen as the response curves of the color camera used to capture the original imagery. The resultant color values in the image will be those values that would have been captured by the camera had the objects actually been in the scene.

All of the different sensors are specified with a common structure. The full spectral response of each sensor is set by the user. These curves must be given before the spectral information for the surfaces is given, because they are used in constructing the surface matrices. The preferred embodiment provides function calls to define the sensor responses.

Overview of the Color Processing System

The color rendering system described herein utilizes a local illumination model, which is defined by treating the spectral information arriving at the image plane to be the result of a single scattering of an emitted light by a surface in a scene or image. Efficient and accurate color representations from full spectral data are possible, because the single scattered light will be viewed directly.

In the described embodiment, object reflectance data and illumination source data is stored in a full spectral format. Utilizing the illumination source data, every type of light source in the scene is described over the full spectrum as a linear combination of basis functions. Therefore, each light source is described by one or more basis functions and a weighting vector defined by the coefficients of a linear combination of the predetermined set of basis functions. For each basis function, a sensor-basis vector is formed by integrating reflectance data, color mixture data, and the basis function over the full spectrum. Thus, each sensor-basis vector includes object color information for the basis function upon which it was calculated.

The sensor-basis vectors define the columns of a matrix. By multiplying the surface matrix by the weighting vector for that source, a sensor vector (such as RGB) for each source is obtained. The resultant final vector is supplied to the monitor via conventional graphics hardware.

Overview of Full Spectral Calculations

Reference is now made to FIG. 3 which illustrates operations to perform full spectral processing in a simplified system that has one light source. For purposes of illustration, geometric information (such as diffuse and specular reflection variation) is implicit in the surface reflectance function.

An object and light source are selected by a user, either directly or through a graphics library in a graphics program. Sensor response curves may be selected by the graphics program, or may be selected by a user. The sensor response curves $R_k(\lambda)$ define the spectral response of each of the k sensors (k=1 to k=L), such as the human eye, that will receive the rendered data. The light source has an associated spectral power distribution $E(\lambda)$ and the surface has an object reflectance $S(\lambda)$.

As illustrated in the next box 310, the single light source is defined by a weighted sum of M basis functions $E_i(\lambda)$ which are not constrained to be orthonormal:

$$E(\lambda) = \sum_{i=1}^{M} \epsilon_i E_i(\lambda) \tag{1}$$

Therefore, a light source vector $\vec{\epsilon}$ defines the light source over predetermined basis functions 1 to M.

As illustrated in the next box 320, light scattered to a viewer 220 (FIG. 2) has a spectral power $I(\lambda)$:

$$I(\lambda) = E(\lambda)S(\lambda). \tag{2}$$

By substitution of Equation 2 into Equation 1:

$$I(\lambda) = \sum_{i=1}^{M} \epsilon_i S(\lambda) E_i(\lambda) \tag{3}$$

In other words, the spectral power distribution arriving at the image plane is a weighted sum of the basis functions multiplied by the surface scattering component $S(\lambda)$.

As illustrated in the next box 330, at the viewer, each viewing sensor k (k=1 to L), (illustrated at 230 in FIG. 2) has an associated sensor response $R_k(\lambda)$.

In order to form a surface matrix S, operation begins in a box 340 to compute a sensor-basis vector for each basis function i. Particularly at 340 for each sensor k, the following integral is calculated to provide a component of a sensor-basis vector for the ith basis function:

$$S_{ki} = \int R_k(\lambda) S(\lambda) E_i(\lambda) d\lambda \tag{4}$$

The lowercase sensor-basis vectors $\vec{s}_i$ are defined for each basis function i:

$$\vec{s}_i = (s_{1i}, \ldots, s_{Li}) \tag{5}$$

A surface matrix is formed in the next box 350 from the sensor-basis vectors. Particularly, the sensor-basis vector for each basis function forms a column of an S matrix.

Thus, color rendering includes computing the sensor-basis vector for each basis function i. Each component in the sensor-basis vector is computed by integrating a sensor response curve with the basis function i and the surface reflectance. For RGB, the conventional color mixture curves, gamma corrected, are used for the sensor response curves.

Using the surface matrix S, operation in a box 360 determines an output value $v_k$ for each sensor k, by multiplying the surface matrix S by a column formed by the light source vector $\vec{\epsilon}$ to provide a vector $\vec{v}$.

It will be apparent to one skilled in the art that, alternately the sensor-basis vectors $\vec{s}_i$ could be utilized in the box 350 to form rows of the matrix S instead of columns, in which instance the matrix multiplication in the box 360 would be replaced by the following matrix multiplication:

$$\vec{\epsilon} S = \vec{v} \tag{6}$$

After the sensor values have been obtained, then operation moves to the box 370 in which further processing and/or display as appropriate are utilized.

Although only one surface matrix has been shown for simplicity, in some embodiments the surface could be described with multiple matrices to account for ambient reflection, diffuse reflection, specular reflection, and other properties, each of which is calculated before summing all of the color values for a final result.

Figure 3A:
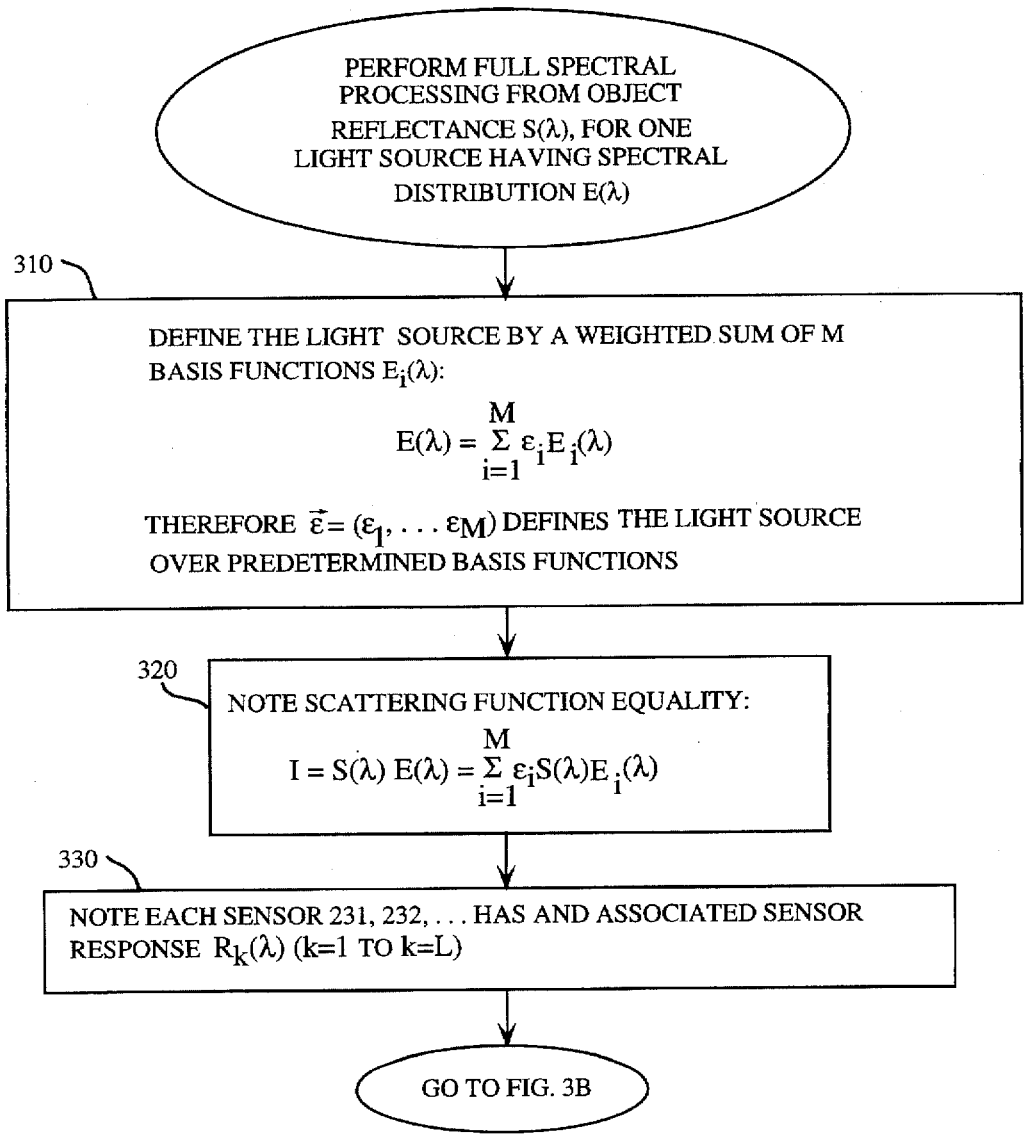
FIGS. 3A and 3B show a flowchart of operations to form a surface matrix and create an output of sensor values from a full spectral object reflectance, sensor responses, and a single light source.
Figure 3B:
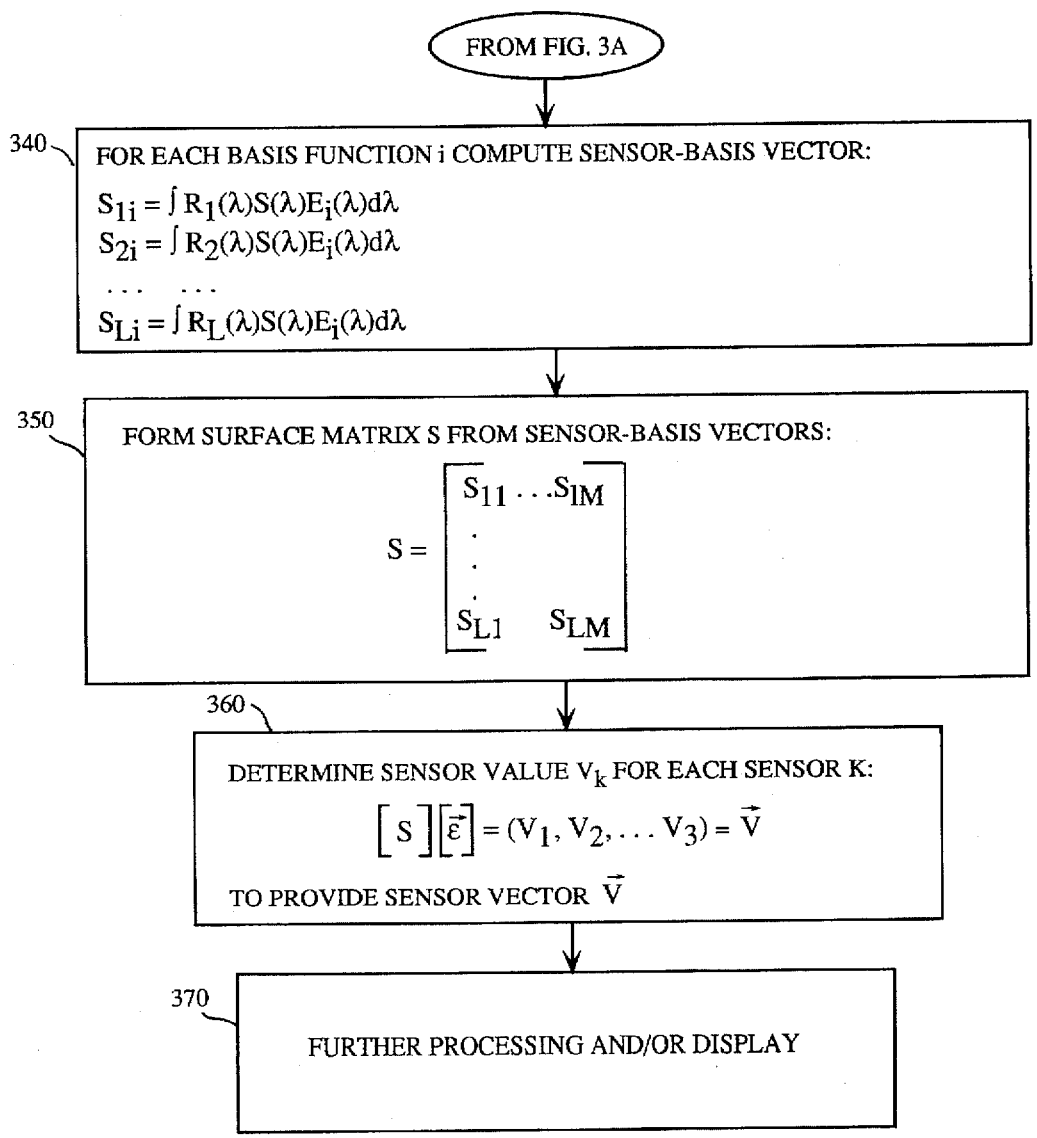
Figure 4:
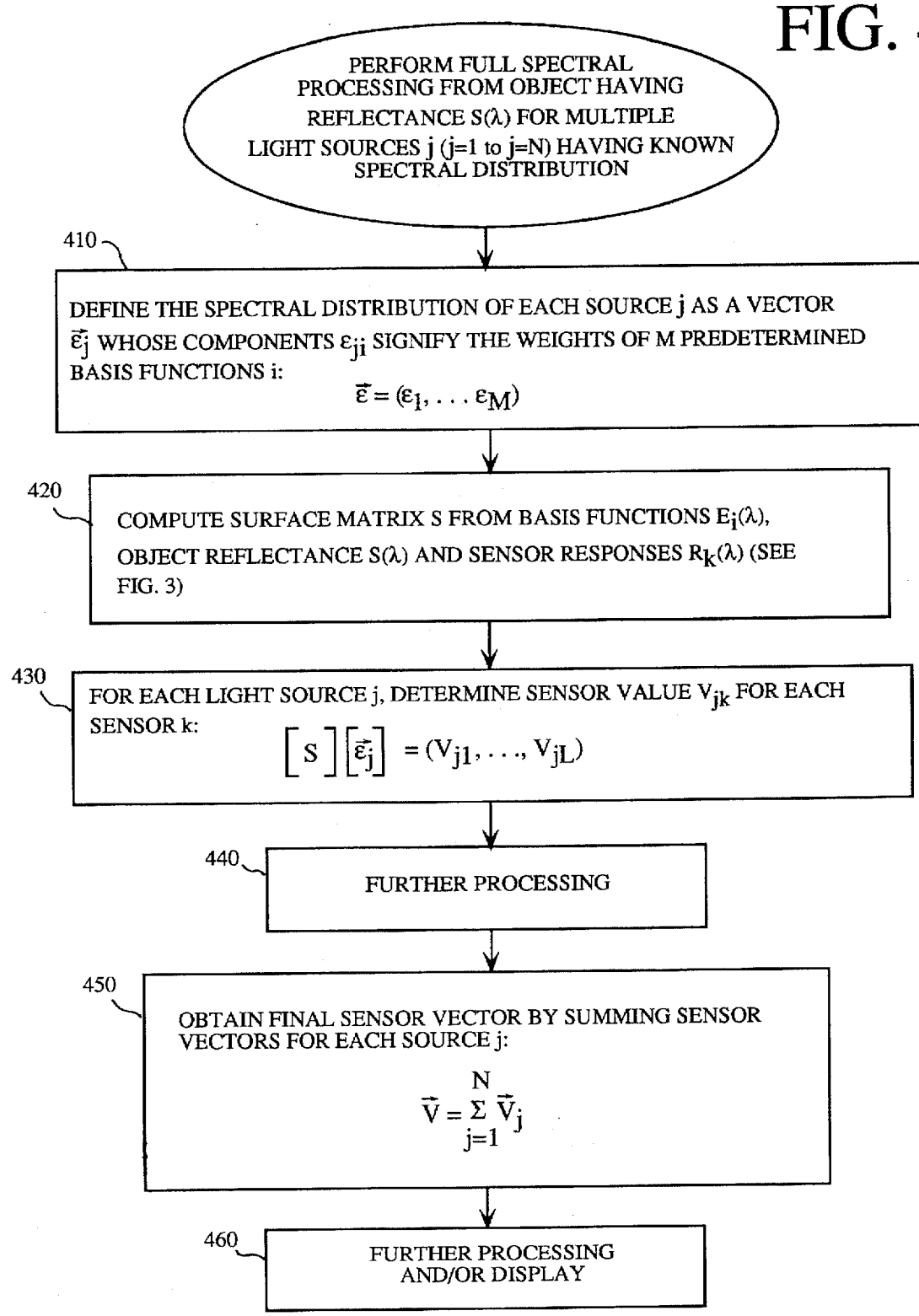
FIG. 4 is a flowchart of operations of a color processing system for multiple light sources.

Reference is now made to FIG. 4 which is a flowchart illustrating full spectral processing for multiple light sources. As in FIG. 3, the object has full spectral reflectance $S(\lambda)$. However, in FIG. 4, multiple light sources are selected, each defining a full spectral distribution. Particularly, each of the N light sources j (j=1 to j=N) has a known spectral distribution.

The illumination sources in the image are selected by a user, either directly or through a graphics library, and supplied by the graphics program to a box 410. The spectral distribution of each source j is defined as a vector $\vec{\epsilon}_j$ whose components $\epsilon_{ji}$ signify the weights of the M determined basis functions $E_i(\lambda)$, where i=1 to i=M:

$$\vec{\epsilon}_j = (\epsilon_{j1}, \ldots, \epsilon_{jM}) \tag{7}$$

Next, a surface matrix S is calculated from the basis functions $E_i(\lambda)$ object reflectance $S(\lambda)$, and sensor responses $R_k(\lambda)$ in accordance with boxes 340 and 350 in FIG. 3.

Next, in a box 430, a sensor value $v_{jk}$ is determined for each light source j and each sensor k by matrix multiplication of the surface matrix S and a column defined by the light source vector $\vec{\epsilon}_j$. Using the sensor values for each light source j, further processing may be performed.

Subsequently in a box 450, a final sensor vector is obtained by summing the sensor vectors (or the processed sensor vectors from box 440) for each source j to provide a single vector:

$$\vec{v} = \sum_{j=1}^{N} \vec{v}_j \tag{8}$$

The final sensor $\vec{v}_j$ is then used for further processing and/or eventual display.

Selection of Basis Functions

Referring both to FIGS. 3 and 4, illumination source data is supplied to the box 310 (FIG. 3) and the box 410 (FIG. 4) in which processing occurs that defines each illumination source as a linear combination of basis functions $E_i(\lambda)$. The number of basis functions has a maximum number M, preferably three so that the light source vector $\vec{\epsilon}$ has only three components. If all the light sources in an image have identical spectral power distributions, it would only be necessary to use that spectral power distribution as a single basis function. However, a typical scene may include multiple light sources with differing power distributions. The sources' spectral distribution is not dependent upon the total number of light sources, but rather the types of light sources. For example, twenty incandescent bulbs are represented by the same spectral power distribution. But three different spectral distributions are required to represent an image that has only three different light sources such as an incandescent light, a fluorescent light, and daylight. It is possible to consider each linearly independent spectral power distribution as the basis function for color computations. However, the dimensionality—and therefore the number—of the spectral power distributions can be reduced by computing a set of basis functions that approximate the original set.

Reduction of dimensionality of spectral power distributions can be performed in many conventional ways. One method to reduce the number of basis functions utilizes a characteristic vector analysis, in which a set of basis functions are selected to best approximate the original set of spectral power distributions. For instance, the CIE has specified a standard set of three basis functions—computed with characteristic vector analysis—to describe all phases of daylight. (Wyszecki, Gunter and Stiles, W. S., *Color Science: Concepts and Methods, Quantitative Data and Formulae*, John Wiely and Sons, 1982.) Better efficiency can be provided by using general basis functions rather than point samples. The use of the general basis functions is more efficient because the number of independent light sources (typically one to three) is significantly smaller than the number of point samples, (nine to twenty).

In the preferred embodiment, the three general basis functions used to describe the light sources in a scene describe the spectral power distributions by three dimensional vectors (M=3) and there are three sensors (L=3). Therefore the ambient, diffuse, and specular surface reflectance components are given by 3×3 matrices. Three basis functions satisfy the needs of many applications of the local illumination model; for any scene with three or fewer spectrally independent light sources, three basis functions will be exact. Furthermore, even for more light sources, the three-basis-function model will be accurate when all the light sources are well described by three basis functions, such as when a small number of filters over light sources are utilized.

Another important reason for using three basis functions is that the existing, efficient hardware implementations of RGB computations can be easily adapted for use with three basis functions. Because light sources in existing systems are already described by a three dimensional (RGB) vector, these systems can be efficiently adapted to handle three basis functions without modifying the way existing hardware handles the light information. Furthermore, by using three basis functions, the existing three component Gourard interpolation can be utilized during shading. Also, the three basis functions are useful for full spectral texture mapping.

Figure 5:
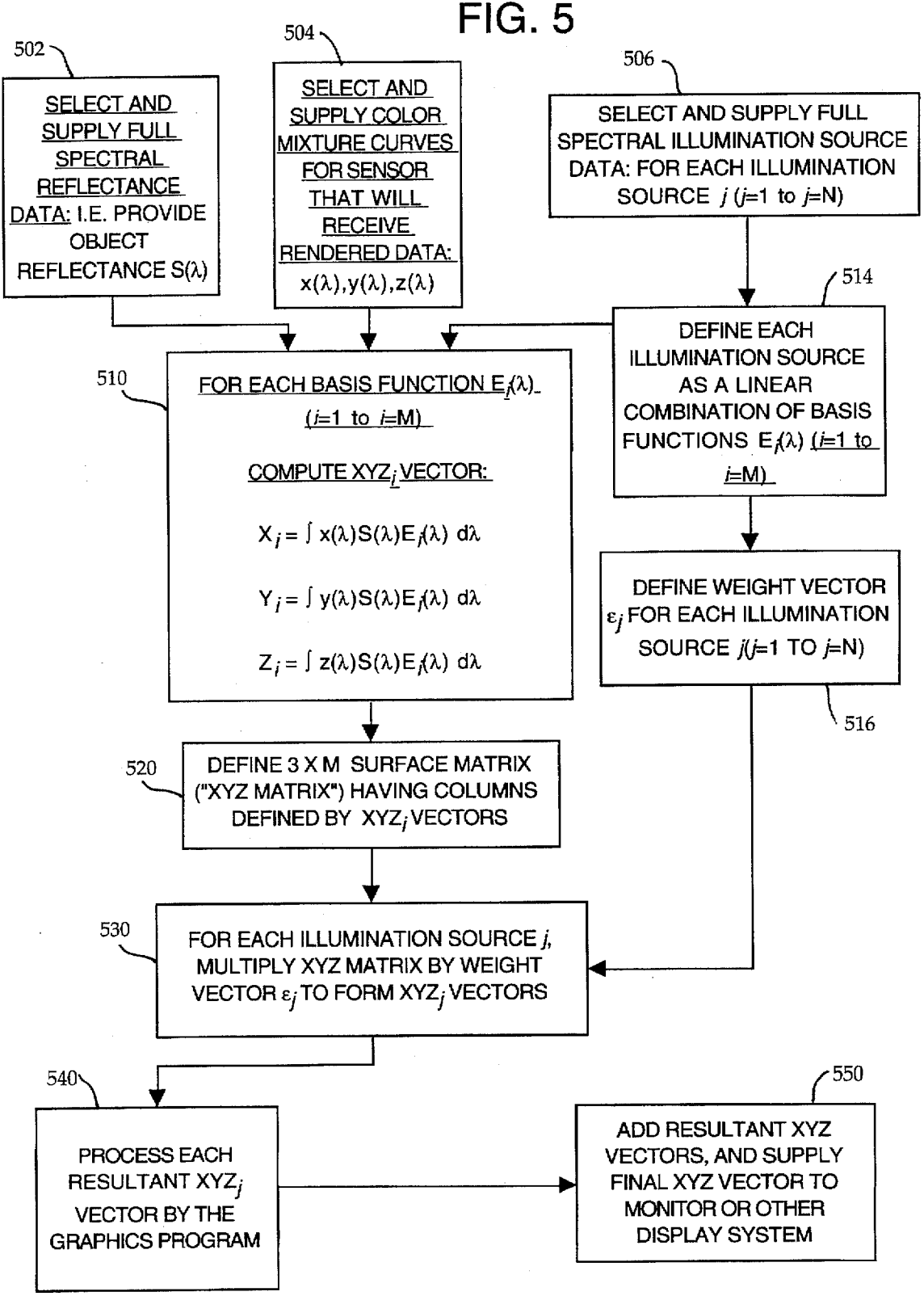
FIG. 5 is a detailed flowchart of operation of a full spectral color processing system for multiple light sources and three sensors.

Reference is now made to FIG. 5, which is a detailed flowchart of color processing in a color rendering system that utilizes full spectral data, multiple light sources and has three sensors: an X sensor having response $x(\lambda)$, a Y sensor having response $y(\lambda)$ and a Z sensor having response $z(\lambda)$.

For accurate color reproduction at each sensor that receives the rendered data, the spectral power distribution will be converted into X, Y, and Z sensor output values 230 (FIG. 2). Particularly, the X value is appropriate for a X sensor, the Y value is appropriate for a Y sensor, and the Z value is appropriate for a Z sensor. In many instances, the XYZ values will correspond directly to RGB values. For RGB values, the sensor is the human eye which has three sensors—a Red sensor, a Green sensor, and a Blue sensor—that represent the human color matching functions based on the RGB primaries of a given monitor.

Beginning in the boxes 502, 504, and 506, full spectral data is selected by, for example, a graphics program, and supplied for subsequent processing. Specifically, from the box 502, full spectral reflectance data indicative of the object reflectance is supplied to a block 510 for computation. Light source data for each source j is supplied from the box 506 to the box 514, from which it supplied to the box 510 for computation.

The object reflectance data $S(\lambda)$ from the box 502 and the light source data in the box 506 has a full spectral format. Full spectral data curves are available from a variety of sources. For example, standard spectral data sets include light source spectral power distributions (e.g., CIE standard illuminants), surface reflectance functions (e.g., Munsell chips) and color filter curves (e.g., Wratten filters). Color mixture curves indicative of the sensors that will receive the rendered data are supplied from the box 504 to the box 510 for use in color processing. Color mixture curves are available and widely known in full spectral format. Examples of such curves include the standard set of CIE curves. In some embodiments, the color mixture curves may be modified to accommodate a particular color monitor, thereby providing color values directly for the monitor. However, in other embodiments, the standard color mixture curves can be utilized. In such embodiments, conversion to color values for the monitor could be performed subsequently.

In the box 506, the full spectral data for each illumination source is selected. Common light sources can be represented in full spectral data: for example, daylight and incandescent light can be specified (as per the CIE) by a transformation between a color correlated temperature and spectral curves for daylight via a standard set of three basis functions. Using the color-correlated temperature, the appropriate full spectral curve can be computed for daylight. For example, incandescent light can be approximated by a Planckian curve which, together with a given color temperature input by the user, can be used for full spectral rendering.

The full spectral illumination data from the box 506 is applied to box 514 to define each illumination source j as a linear combination of basis functions $E_i(\lambda)$. Each illumination source j (j=1 to j=N) is defined by a weight vector $\vec{e}_j$ whose components signify the weight of each basis function $E_i(\lambda)$, thereby defining each source j in full spectral format as a weighted combination of basis functions.

In the box 510, each of the color mixture curves is integrated with the object reflectance a $S(\lambda)$ and each basis function $E_i(\lambda)$ to compute an $XYZ_i$ vector for each basis function $E_i(\lambda)$, where i=1 to i=M. The resultant M $XYZ_i$ vectors are supplied to a box 520 in which the XYZ vectors are utilized to define a 3×M Surface Matrix, termed herein the "XYZ matrix." The $XYZ_i$ vectors define the columns of the XYZ matrix.

The XYZ matrix is supplied to a box 530 which also receives each weight vector from the box 516. For each illumination source j, the XYZ matrix is multiplied by respective weight vector j, in order to form $XYZ_j$ vectors.

In some embodiments, the $XYZ_j$ vectors could be added together directly to provide output XYZ vectors. Alternatively, the weight vectors could each be summed before being multiplied by the XYZ matrix. However, in the described embodiment, each of the $XYZ_j$ vectors is supplied to a box 540 in which the graphics program further processes each XYZ vector. Certain types of processing are simplified by provision of the separate $XYZ_j$ vectors for each source. For example, certain geometrical effects of each source may, in some systems, be more easily taken into account with the separate $XYZ_j$ values.

Finally, in the box 550, the resultant $XYZ_j$ vectors are used to supply a final XYZ vector to the monitor.

Full Spectral Rendering System Description

Figure 6:
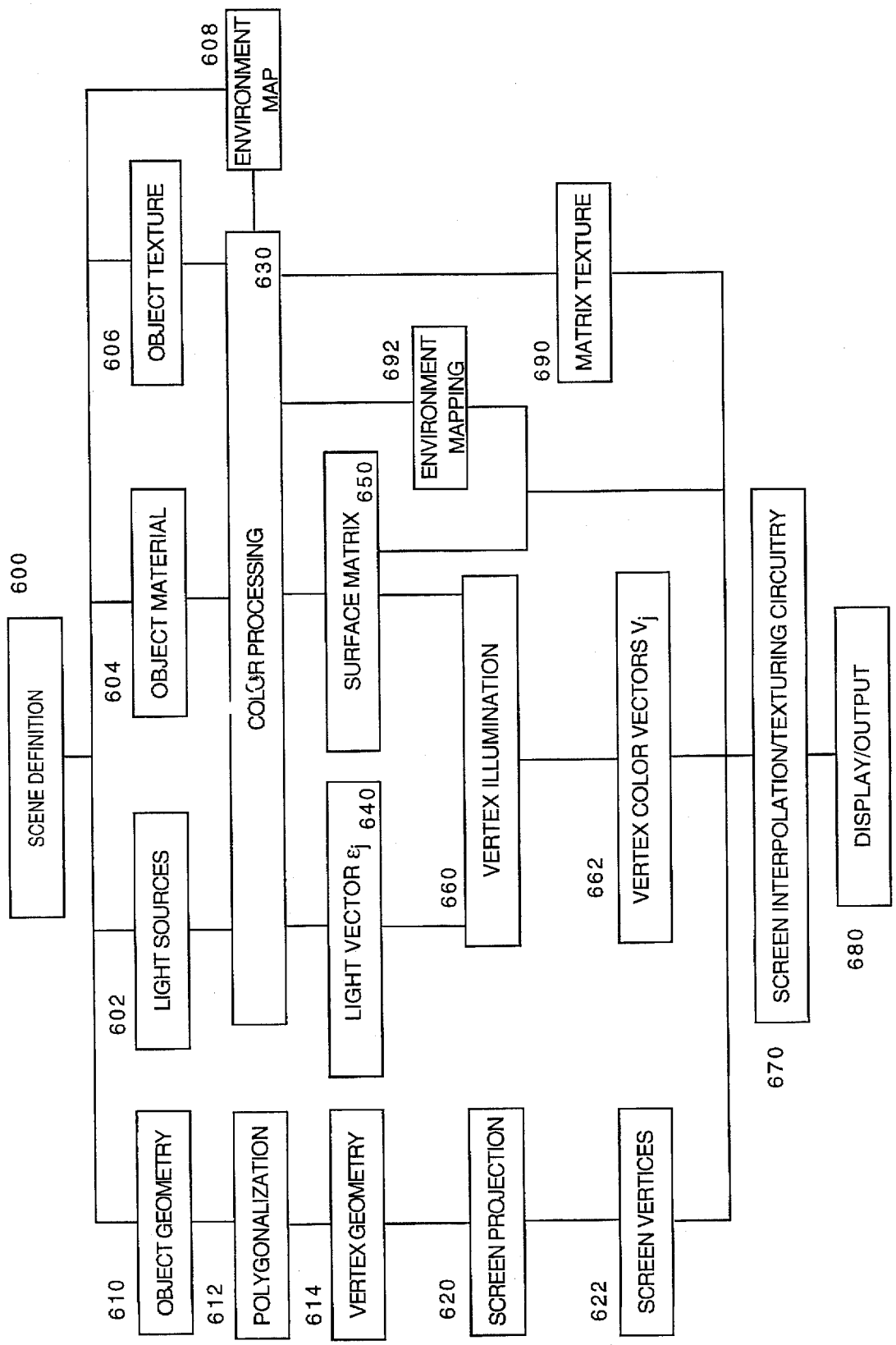
FIG. 6 is a block diagram of a full spectral rendering system.

Reference is now made to FIG. 6 to illustrate, in block diagram form, a circuitry that implements full spectral rendering and can operate according to the vertex illumination model, and optionally can also provide texturing and/or environment mapping.

In the implemented embodiment, resources are provided to the user to compute the color representations from full spectral data, which may be given by the user. Utilizing these resources, data can be provided by the user in full spectral form, and software in the system can calculate the matrix information used by the rendering system. In addition to the actual spectral curves of the lights and surfaces, the basis functions and sensor properties must also be specified.

Typically, the spectral curves of the lights, surfaces, and sensors are assumed to be functions sampled at high densities (sometimes hundreds or more samples). Operations such as characteristic vector analysis and integration are solved via linear algebra techniques in conventional ways. The user can specify his or her own set of basis functions, or routines can provide point sampling or characteristic vector analysis to automatically compute basis functions. To use characteristic vector analysis, the user inputs the spectral power distributions of the light sources, and the processing system, preferably implemented in hardware returns a set of basis functions that best approximates them such as described in Mardia, supra.

In addition, the user can specify the characteristics of the sensors or display device; this information is required to compute the surface matrices. The default setting is the human perceptual response displayed on a given RGB monitor. However, the user could select a different response if, for example, the final images were to be merged with a specific camera.

Given these two specifications, we provide tools that return a vector when given a spectral power distribution (from lights or environment map) and return a matrix when given a surface component (from objects or texture maps).

When implemented, linear color representations are mathematically equivalent to matrix multiplication. At each point in the rendering system for which light is scattered from a surface scattering component, linear color representations are employed. This includes each component of the illumination model (ambient, diffuse, specular, and other terms) as well as full spectral texturing and environment mapping. Internally, the scattering components are characterized by matrices, and the light source spectral curves are given as vectors of coefficients.

For polygon lighting and shading, matrix multiplication takes place at polygon vertices before scan conversion of color values. Because the interpolation is linear, no additional loss of accuracy is incurred.

Full spectral texturing requires a matrix multiply at each visible texture location during interpolation. In the preferred embodiment, matrices are stored at each point in a texture for this purpose. The hardware used for this computation is shown in FIGS. 6, 7, and 10–19. The texture is stored in N separate planes, where N is the total number of light basis functions. Each plane is a single column in the matrix describing the surface scattering at that point in the texture. The underlying polygon is chosen to have a perfectly reflecting surface, so upon vertex lighting and interpolation, each underlying pixel contains the coefficients of the light. These coefficients are multiplied with the appropriate texture planes before being summed together to obtain a final color value.

Beginning in a box 600, the user defines the scene in full spectral format. For example, as illustrated in previous FIGS. 3, 4, and 5, the user may specify the object reflection's function $S(\lambda)$, the light sources, and the sensor responses. Particularly, the user supplies light sources 602 in full spectral format, object material 604 in full spectral format, object texture 606 in full texture format and environment map 608 in full spectral format. (The user may also input sensor response functions as shown at 706 in FIG. 7.) Furthermore, the user defines the object geometry at box 610.

Using the object geometry 610, the system performs polygonization in the box 612. Next, using this information at 614, the system computes vertex geometry. Subsequently, at 620, the system takes the viewer's position into account and projects the image onto the screen, thus at box 622, providing screen vertices.

Polygon Lighting and Shading

Utilizing the three basis functions, the main difference resulting from vertex lighting computations is compensation for ambient, diffuse, and specular surface reflectance matrices at each vertex. A function can be provided that allows a user to load matrices into material property definitions as well as a function to activate a given material property. Active material is utilized during lighting until another material is activated.

The Phong illumination model can be used to compute color values and polygon vertices, and Gourard interpolation is then used to fill each polygon. The ambient, diffuse, and specular color components are each computed from a corresponding matrix multiplication operation that converts the incoming vector of light coefficients to appropriate sensor values. These vertex sensor values are interpreted similarly to typical and conventional renderers. As a result of the linearity of the representations, no loss of accuracy is incurred beyond the typical interpolation error present with Gourard shading.

The color information from the light sources 602, the object material 604, and the object texture 606 is applied to color processing box 630. In order to more completely describe operations within color processing box 630, reference is made to FIG. 7.

Figure 7:
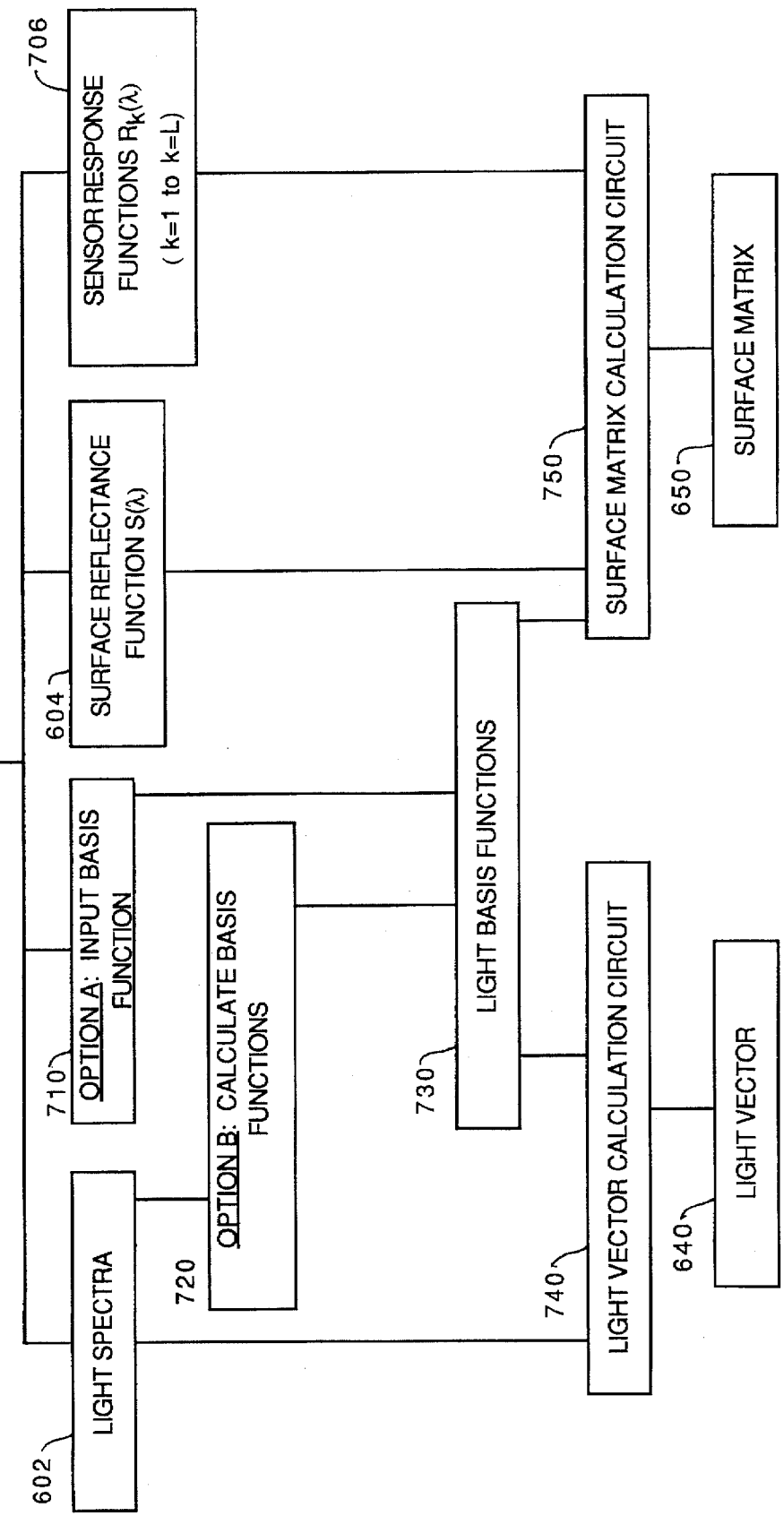
FIG. 7 is a block diagram of a color processing system for the full spectral rendering system of FIG. 6.

The conversion from full spectral data to internal representations is shown schematically in FIG. 7. Several processing paths can be selected by the user, but the end result is a light vector (either for a source or environment map) and surface matrix (either for a vertex or for a texture location) to be used in linear color representations.

To compute the matrices and vectors in full spectral format requires light basis functions that describe the light sources in full spectral format and sensor responses in full spectral format. For each source j (j=1 to j=N), a light vector $\epsilon_j$ is computed from the basis functions and the light's full spectral curve whose elements $\epsilon_{ji}$ represent the weights of each basis function $E_i$.

The light vector $\epsilon_j$ for each source j is computed in the following manner. The basis functions and a light spectral curve for each source j are provided by any suitable input such as user selection from a library of light sources, or by user selection. If the basis functions are not orthonormal, then an orthonormal set is constructed from the original basis set via a M×M linear transformation. The weights for each source are computed by integrating the light spectral power distribution over the orthonormal set. If using transformed basis functions, the computed weights are inverse transformed to obtain the weights for the original set, using well known mathematical techniques such as described in Mardia, et al, *Multivariate Analysis*, Academic, London 1979.

In FIG. 7, the user input 600 is represented as including the light spectra of the light sources 602 and the surface reflectant function S(λ) which is indicative of the object material. The user has at least two options: Option A at 710 in which the user inputs basis functions as illustrated or Option B illustrated at 720 in which the system calculates basis functions. Under Option A in the box 710, the user selects the basis functions that he wishes to use for the light spectra of the sources. The resulting light basis functions are illustrated at 730.

Under Option B at 720, the user can input the light spectra in any of a variety of functional formats, and the system transforms the spectral data of each source into a series of basis functions to provide the resulting light basis functions at the box 730.

In order to calculate a light vector $\vec{\epsilon}$ for each light source j, light basis functions from 730 are applied to a box 740 in which a light vector for each source is calculated and output to box 640 (also shown in FIG. 6).

The user interface of the preferred embodiment can be modified to include a variety of systems that implement various methods to load the linear color representations into the system. Some of these systems are shown in FIG. 7, in which the user can directly input matrix and vector information to the rendering system via function calls.

In an alternate user interface, a functional layer can accept full spectral curves from the user, and responsive thereto, output matrix and vector data for the internal representations. This alternate user interface executes in two possible states, both of which assume that the user inputs lighting information before material information.

In one state of the alternate user interface, the user inputs full spectral curves that define the basis functions to use to describe the light spectral power distributions. After the basis functions are defined, the user can input full spectral curves of light sources of material properties, and routines automatically convert these curves into the corresponding linear color representations.

In a second state of the alternate user interface, which is a preferred method, the user inputs the full spectral curves of the light sources directly, and the system responsive thereto selects a set of basis functions to use. Using the selected basis functions, the system computes the appropriate lighting vectors for each light. The surfaces are also defined directly as full spectral curves, which are converted to matrices using the precomputed basis functions.

Referring still to FIG. 7, the light basis functions at 730, the surface reflectance function at 604, and the sensor response functions at 706 supplied to calculate a surface matrix calculation circuit at 750. Particularly responsive to a surface reflectance function in full spectral format, a surface matrix is computed for each basis function and each sensor. Given the basis functions, the sensor responses, and a surface spectral curve, the surface matrix is computed as illustrated in FIGS. 3A and 3B (boxes 340, 350) from the set of relations $S_{ki} = \int R_k S E_i$. If desired, one or more optional linear transformations can be applied to convert the sensor responses into a desired set (for example, for display on another output device). Such options may be user-defined. These operations within the surface matrix calculation circuit proceed in accordance with previous discussion with reference to FIGS. 3A and 3B. The output is a surface matrix 650 (also illustrated in FIG. 6).

Returning now to FIG. 6, the light vector 640 and surface matrix 650 are applied to a vertex illumination circuit 660 which performs matrix multiplication of the surface matrix 650 by a column light vector $\vec{\epsilon}_j$ for each light source j. The outputs, at 662 are vertex color vectors $V_j$. These vectors may be added together to provide a single vector $\vec{v}$. color vectors applied then to a screen interpolation/texturing circuitry 670 in which the colors at each vertex are interpolated within the polygon. The interpolated values are then available at 680 for display or output.

Discussion of Matrix Texturing in the Context of the Full Spectral Rendering System Referring still to FIG. 6, the user may optionally specify an object texture 606. The texture map is used to specify the surface reflectance at each point in the texture, and therefore each point within the texture has an associated surface reflectance function. In one embodiment, such as shown in FIG. 7, the surface reflectance S(λ) at each point texture is converted to a surface matrix in the circuit 750. The collection of surface matrices define a matrix texture 690. In another embodiment, the surface matrices could be precomputed for predetermined basis functions and sensor response functions, and supplied directly by the user or under his control.

The matrix texture at box 690 is applied to the screen interpolation/texturing box circuitry 670. The texture is textured into the polygon into which it is associated, and the vector from 662 is multiplied therewith. One implementation will be described with reference to FIGS. 10 and 11. In general, the output then is supplied to the display output at 680. Using the matrix texturing option, the surface matrix 650 and the light vector 640 may be calculated as usual. The texturing occurs after the vectors at 662 have been calculated.

Environment Mapping in a Full Spectral System

If the user has specified an environment map 608, each point within the environment map 630 defines a spectral power distribution, which is supplied to color processing circuit 630 in which each spectral power distribution is converted to a light vector. Referring to FIG. 7, the light spectral at box 602 are applied to box 740 to calculate a light vector (assuming that the basis functions are predetermined). Then each point within the environment map is a vector that represents the light source as a vector whose components represent the weight of each predetermined basis function. If the environment mapping option is chosen at 692, then a surface matrix 650 is calculated but, in the vertex illumination circuit 660, the light vector 640 may not be utilized because it will be instead replaced during later processing by the environment mapping 692. Therefore, in environment mapping, the screen vertices 622 have surface matrices 650 associated with them. Then in the box 670, the interpolation circuitry interpolates the surface matrix within each polygon. At each point within the polygon, matrix multiplication of the vector at the associated point in the environment map is performed to provide a sensor vector output at each point. Then the resultant values are available for further processing, display, or output at 680. Possible implementations of environment mapping are illustrated in FIGS. 12–19.

An Exemplary Implementation for the Color Rendering System

Figure 8:
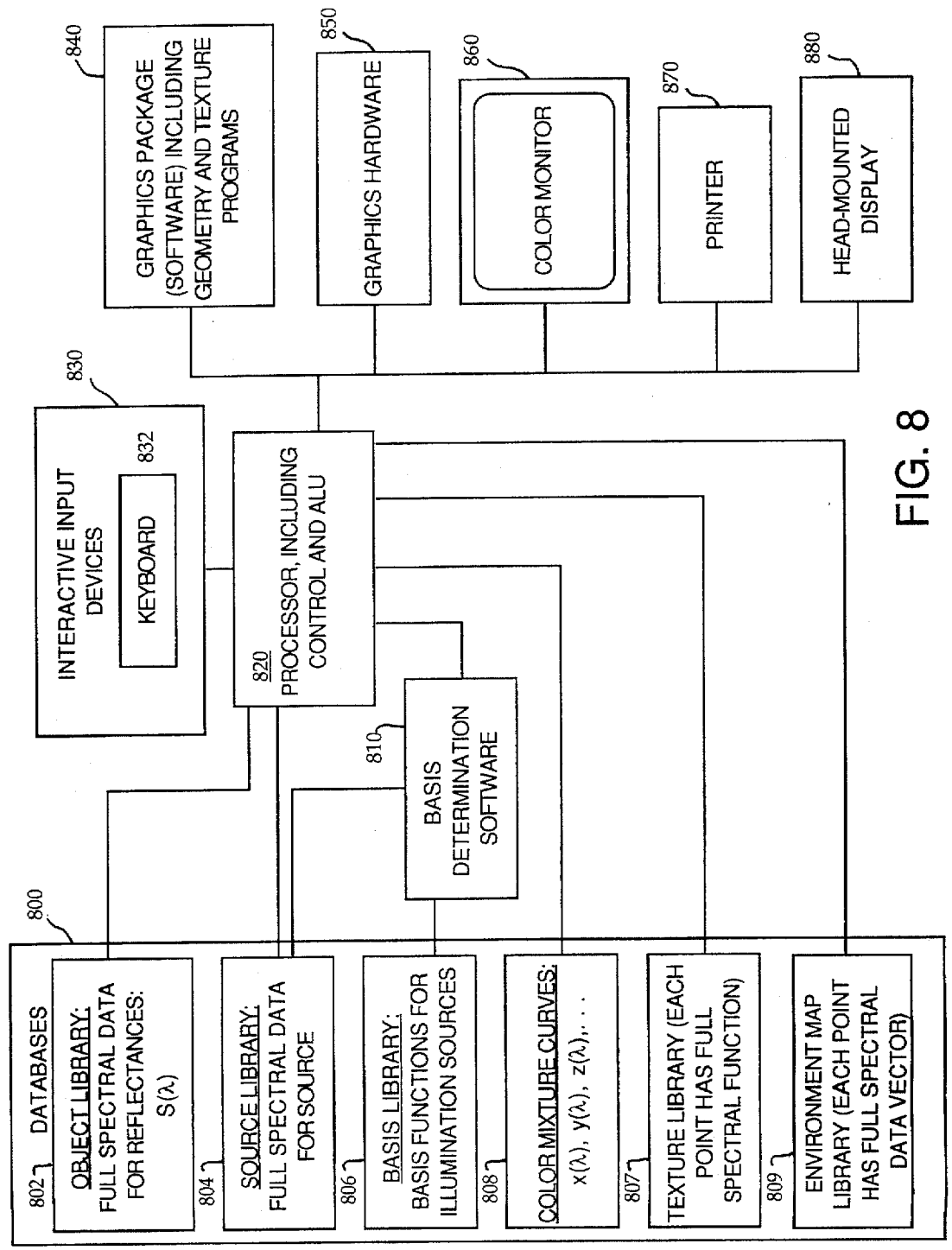
FIG. 8 is a block diagram of a computer system that implements a full spectral color rendering system.

FIG. 8 is a block diagram of one possible implementation of the color rendering system. The databases 800 can be stored in any suitable memory, such as a hard disk drive. The databases 800 include an object library 802 that include a plurality of objects indexed by the type of object so that a user or program can select a particular object. Each object has a function stored in the library that represents the object's full spectral reflectance.

A source library 804 is included with full spectral data for a number of sources, indexed to be selectable by the user.

A basis library 806, which is optional, provides a list of common basis functions for illumination sources. In some embodiments the basis library could be combined with the information from the source library.

A texture library 807 includes any number of predetermined texture maps, each texel being defined by a full spectral function, or predefined matrix textures.

An environment map library 809 includes a plurality of environment maps, each point having full spectral data associated and stored therewith or predefined vector environment maps.

Color mixture curves in a block 808 include any standard color and mixture curves. Preferably the color mixture curves include at least standard CIE curves.

The basis library 806 is coupled to basis determination circuitry or software 810, which is utilized in conjunction with the source library 804 to determine the basis functions for a particular chosen scene.

A processor 820 is provided to control all operations to transfer data from the object library 802, the source library 804, basis library 806, the color mixture curves 808, the texture library 807, the environment map library 809, and the basis determination software 810. Additionally, the processor 820 is coupled to interactive input devices 830, such as the keyboard 832, which provides user input. For example, the user may input a basis function.

Furthermore, the processor 820 is coupled to graphics package 840, including geometry and texture programs, to graphics hardware 850 that can perform the high speed linear color representations, texturing, and environment mapping useful for implementing the invention, and a color monitor 860 to display the resultant data. The color monitor 860 includes any of a number of monitors, such as CRT or LCD monitors. The processor 820 is also coupled to a printer 880 for printing color data and a head-mounted display 880 such as may be suitable for infrared viewing.

In the preferred embodiment, the hardware structure resembles that of a standard RGB polygon renderer because the representations described herein are generalizations of RGB representations. The similarity allows current hardware architectures to implement full spectral rendering without drastic redesign. A prototype system has been implemented by modifying the GEOMETRY ENGINE® software on a Silicon Graphics REALITY ENGINE® graphics processing system.

Figure 9A:
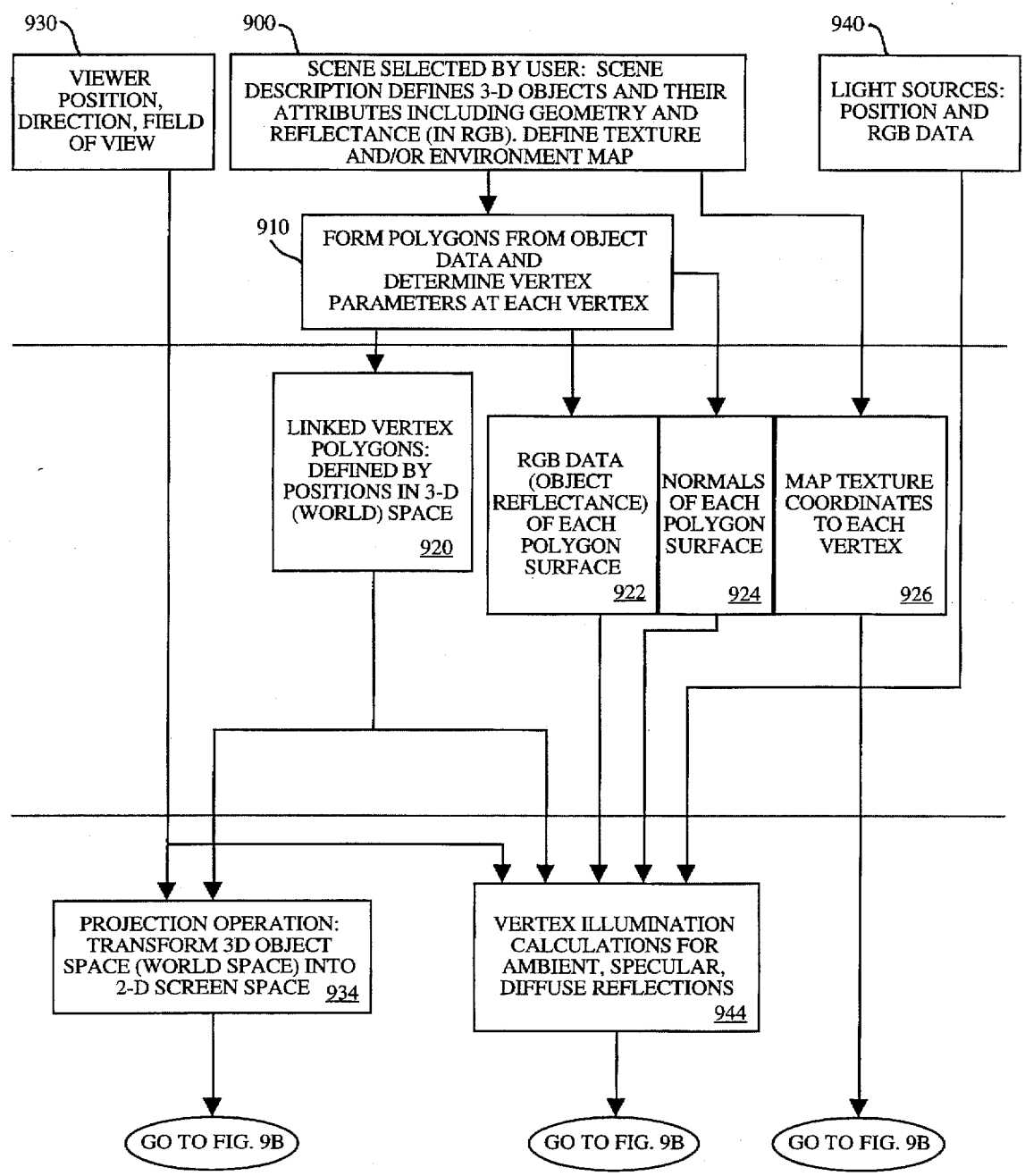

Reference is now made to FIG. 9A and 9B, which is a flowchart that illustrates the OpenGL® graphics system architecture in a Silicon Graphics color graphics processor which is described, for example in a publication by Mark Segal and Kurt Akeley, The OpenGL® *Graphics System*, Version 1.0, Silicon Graphics, Inc., Mountain View, Calif., Dec. 28, 1993. In the OpenGL® graphics system described therein, all color data is in the form of RGB. Particularly, the light sources, the object reflectance, texture maps, and environment maps are all stored in terms of RGB values.

Beginning at box 900, a scene is selected by the user. The user selects three-dimensional objects and their attributes, including geometry. If desired, the user may choose a texture and/or an environment map.

At box 910, the three-dimensional objects are utilized to form a number of contiguous polygons, and vertex parameters are determined at each vertex. Particularly, at 920, a number of linked vertex polygons are provided, defined within the computer by their positions in world space. Vertex parameters are provided at 922, 924. Particularly, the RGB data indicative of all object reflectance of each polygon surface is provided. At 924, the normals of each polygon surface are supplied at the vertices. At 926, if a texture map has been selected by the user, then the texture coordinates are mapped to each vertex.

Utilizing the link vertex polygons in world space at 920, and at 930 a user-defined viewer position, direction, and field of view, operation moves to box 934 in which a projection operation occurs that transforms the three-dimensional world space into a two-dimensional screen space. In parallel, the linked vertex polygons at 120 are utilized with the RGB data 922 and the normals in 924, as well as user-specified light sources at 940 to perform vertex illumination calculations. For example, the calculations may allow for ambient, specular, and diffuse reflections.

Turning now to FIG. 9B, the flow chart shows at 950 that screen polygons are defined, at 954 that an RGB value is defined at each vertex, and at 956 that the texture coordinates at each vertex are mapped to a screen coordinate.

Utilizing the screen polygons at 950 and the RGB values at each vertex from 954, the system performs screen interpolation at 960. Particularly, each of the screen polygons are filled to obtain a single RGB value at each location within the polygon.

If texture mapping has been chosen, then the interpolated texture coordinates are textured at 970. Subsequently at 974, the texture table is looked up and filtered to obtain an RGB value at each pixel within the polygon. Subsequently at 980, the textured value and the screen interpolated value are combined (by multiplication or addition for example) to provide a composite texture at 980.

An RGB value is output from a compositing step 980 to provide an RGB vector at 982. Subsequently at 990 other processing operations such as blending, look-up tables or hidden surface computations may be performed. As shown at 992 after such other processing, each pixel in the image RGB value has been defined and therefore operation moves to 994 to display the image on an RGB monitor.

Discussion of Full Spectral System Described Herein as Opposed to RGB System of FIGS. 9A and 9B The full spectral rendering system described herein is distinguished from its RGB counterpart in that it performs illumination calculations with the linear color representations rather than in RGB. This includes one or any combination of vertex illumination, full spectral texture mapping, and full spectral environment mapping. Each option is discussed presently.

FIGS. 10–19 are flow charts and circuit block diagrams that can be used with the prior art system illustrated in FIGS. 9A and 9B to implement a full spectral rendering system.

Vertex Illumination

In hardware-accelerated systems, vertex illumination typically is performed in special circuitry that provides some level of programmability. For example in the Silicon Graphics Reality Engine System, Intel, 860 processors are programmed to perform RGB calculations. Of course, the type of processing circuitry may differ from one embodiment to another.

The system described herein replaces the RGB calculations with full spectral representations based on the linear color representations described in reference to FIGS. 3–5. Mathematically, this translates into performing matrix multiplication that transforms incident light vectors into sensor vectors, rather than the prior RGB computations.

The illumination calculation may differ depending on the illumination model chosen for the processing, but typically the model includes ambient, diffuse, and specular terms. This implies an ambient, diffuse, and specular matrix for each vertex. Each matrix gets multiplied by an appropriate light vector to provide a set of sensor vectors. These vectors are weighted by geometrical factors in known ways and summed together for a resultant vertex sensor vector.

The sensor vectors are interpolated within the polygon to compute a final sensor vector at each pixel.

Texture Mapping

Reference is now made to FIG. 20 to describe texture mapping. In texture mapping, an image is mapped onto a surface. This approach may be known as texture mapping or pattern mapping; the image is called a texture map, and its individual elements are often called texels. Texture mapping is a known process for interactive graphics, and is described, for example in publication entitled "Computer Graphics" by Foley et al., *Addison-Wesley Publishing Company*, Menlo Park, Calif., 1990, pp. 741–745.

In FIG. 20, a rectangular texture map 2010 has its own texture coordinate space (u,v). In other embodiments, the texture may be defined by a procedure. At each rendered pixel within the texture map, selected texels are used either to substitute for or to scale one or more of the surface's material properties, such as its diffuse color components. One pixel is often covered by a number of texels. To avoid aliasing problems, a linear-filtering operation is performed. For example, trilinear mip-mapping may be used.

One specific method of filtering for textural mapping is illustrated in FIG. 20, in which texture mapping is described in two steps. The image space is shown in an x,y coordinate space 2020. In the first step, the four corners of a pixel 2022 in the texture map is mapped onto the surface 2030 of an object to be rendered. A shaped surface 2032 is defined in a (s,t) coordinate space 2030. Therefore the mapping naturally defines a set of points in the surface's (s,t) coordinate space 2030. Next, the pixel's corner points on the surface 2032 are mapped into the texture's (u,v) coordinate space 2010. The four (u,v) points in the texture map 2010 define a quadrilateral 2034 that approximates the more complex shape into which the pixel may actually map due to surface curvature of the object 2032. The value is computed for the pixel by summing all texels that lay within the quadrilateral 2034 in the texture map 2010, weighting each by the fraction of the texel that lies within the quadrilateral 2034.

If a transformed point in the (u,v) space 2010 falls outside the texture map 2010, the texture map 2010 may be thought of as being replicated. Instead of always using an identity mapping between the surface of an object 2030 and the texture map 2010, a correspondence can be defined between the four corners of the shaped surface 2032 in the surface 2030 and a quadrilateral in the texture map 2010. When the surface 2032 is a polygon, it is common to assign texture map coordinates directly to its vertices.

In one embodiment of the invention, textures are mapped on a pixel-by-pixel basis during polygon scan conversion. Full spectral information is accurately handled by providing for two types of texture mapping: (1) intensity mapping and (2) full spectral mapping.

The intensity mapping operation uses a one-component textured value at each pixel to modulate the underlying color computer during this shading step. This mode is useful on texturing objects having uniform reflectance properties but non-uniform shading, such as grass or wood. Due in part to the linearity of the color representations, intensity mapping can be performed on each computed sensor ($XYZ_i$) values.

Figure 10:
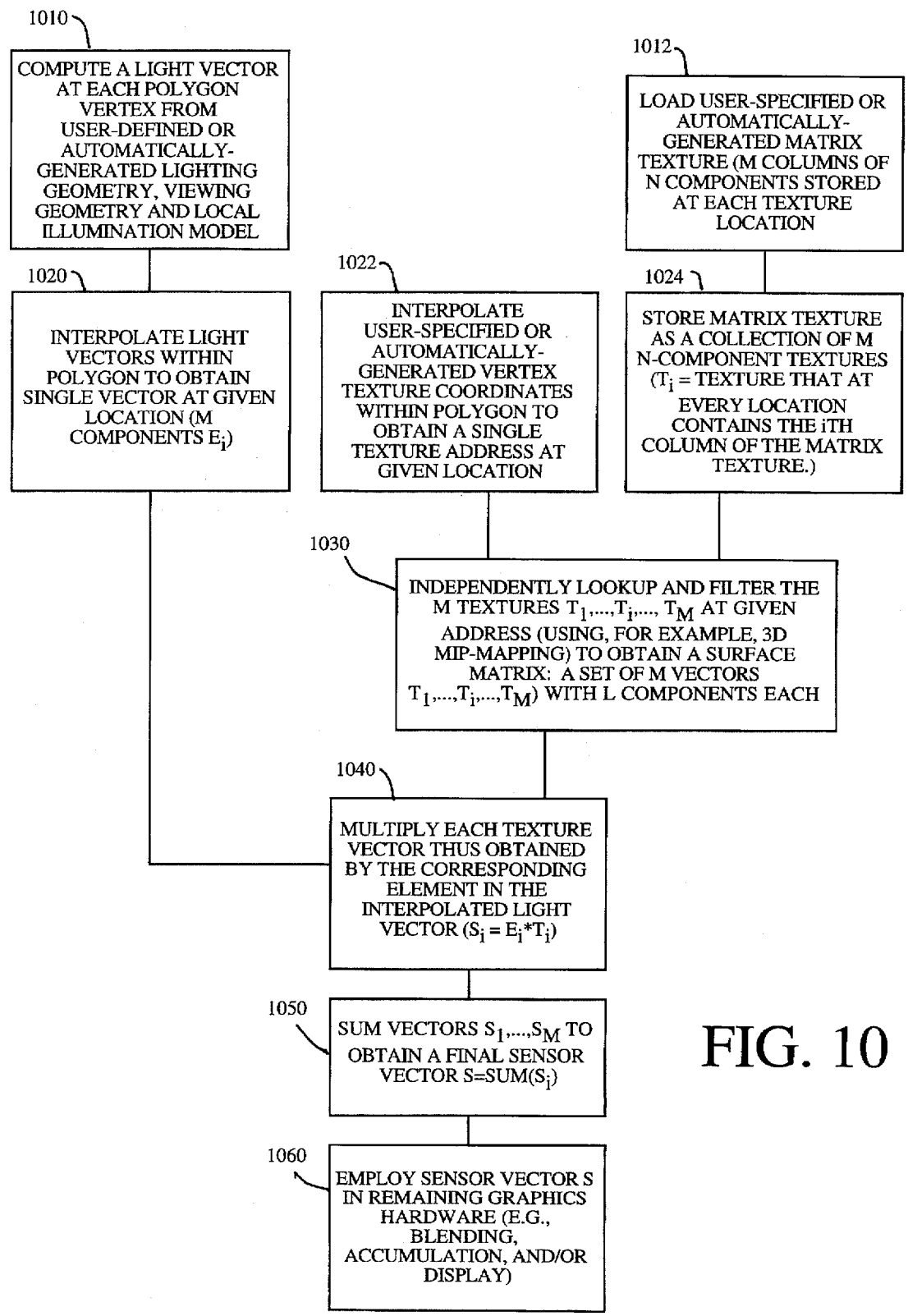
FIG. 10 is a flow chart illustrating full spectral texture mapping, in which the texture is a surface matrix and the vertex illumination model provides the light vector.
Figure 11:
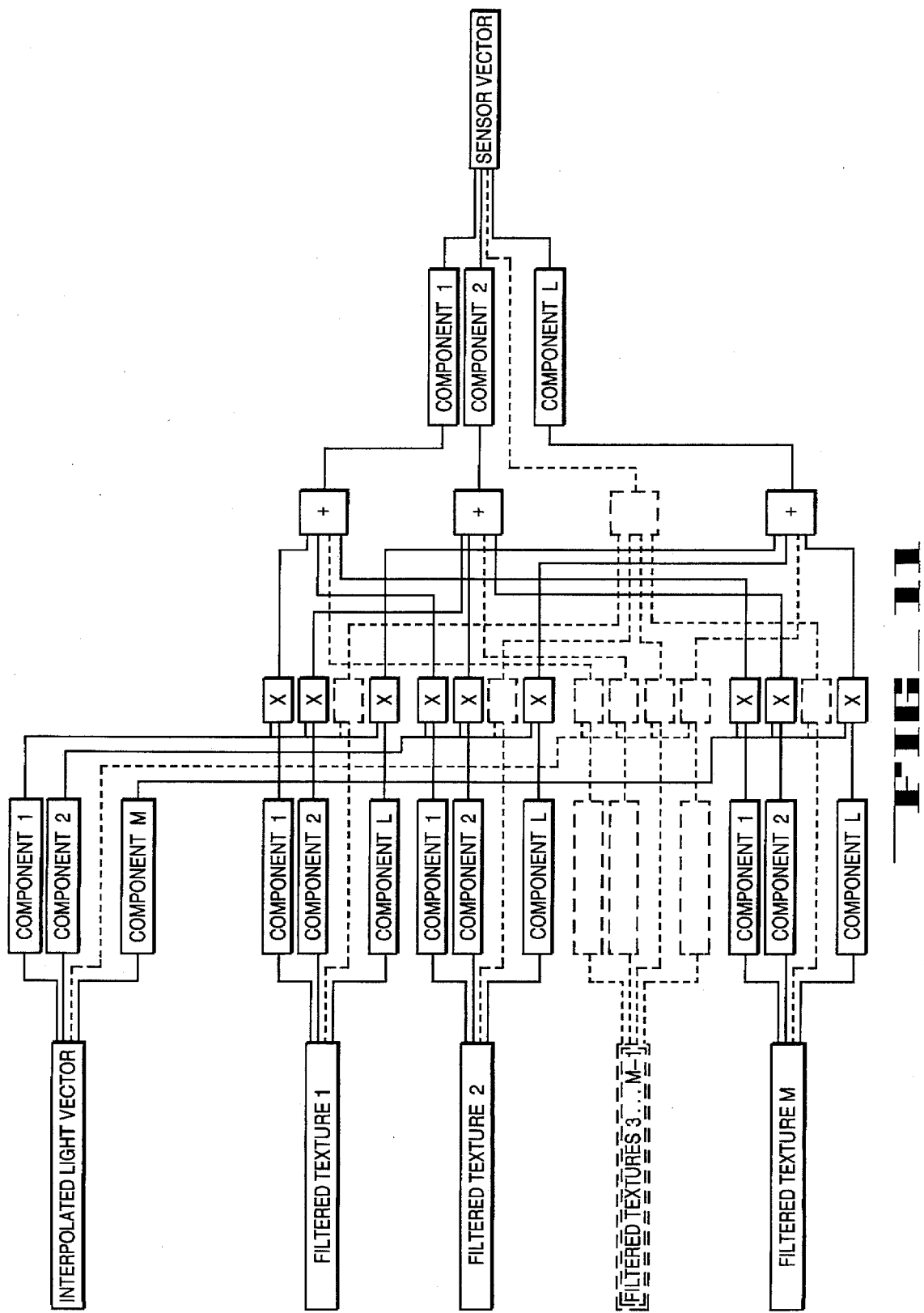
FIG. 11 is a hardware implementation of the system shown in FIG. 10.

Full Spectral Texturing Example of FIGS. 10 and 11

Reference is made to FIGS. 10 and 11 to describe full spectral texture mapping, which is unique to full spectral rendering. In order to perform full spectral texture mapping, a surface matrix is loaded at 1012 and stored at 1024 at each texel. The surface matrix is derived from the basis functions used for the light sources as previously described with reference to FIG. 3. In order to provide accurate shading computations, the matrix is multiplied by the correct lighting vector of each light, and the reflected values are scaled by a geometry coefficient. This task can be accomplished by describing the ambient, diffuse, and specular components of the underlying surface as scaled identity matrices; i.e., the surfaces are described as spectrally white. As a result, the incoming light vector is scaled by geometry values obtained from the contributions of the ambient, diffuse, and specular components of the underlying surface.

A preferred design includes three three-component texture map computations performed at 1024 in parallel although any number of sensors and basis functions can be utilized. Address generation at 1022 derived from the pixel texture map perimeters is common to all three computations. The system can be implemented so that the computations are performed on rows or columns. If the system is implemented by columns, each set of computations handles one column of the texture matrices when performing filtering operations at 1030 such as trilinear mip-mapped filtering. (Of course, in some embodiments the system could be implemented in rows.) This subdivision is allowed because of the linearity of the representations.

Beginning at 1010, these light vectors at the vertices are interpolated at 1020 within the polygon, and multiplied at 1040 at each pixel with the appropriate surface matrix from the full spectral texture map. The hardware to perform the multiplication at 1040 is shown in FIG. 11.

After filtering at 1030, the three rows of a final matrix are multiplied at 1040 and accumulated at 1050 with the pixel shading values 1020, which, as described above, are the coefficients of the light values scaled by the appropriate geometry factor. The combination effectively performs the matrix multiplication at 1060, converting the light coefficients reflected from the textured surface into appropriate sensor values, such as RGB.

Environment Mapping

Reference is made to FIGS. 21, 22, and 23. Environment mapping includes a collection of techniques by which an object is represented responsive to the environment surrounding it. Environment mapping may be understood by first considering that rendering a point in computer graphics can be broken into two steps: 1) determining the illumination incident on a point; and 2) given the incident illumination, what is the light scattered to a viewer.

Environment mapping simplifies the first step 1) by precomputing and storing the illumination incident on that point from all directions in an environment. Since directionality has two dimensions, defined on the surface of a sphere, the illumination can be stored in a two-dimensional map known as an environment map.

The principal idea behind environment mapping is, given a direction, we can find the illumination at a point by simply looking up the point in the map at the location corresponding to that direction. The map can be stored in a variety of formats, such as latitude-longitude, cube map, or sphere map.

Given the illumination from the map, we need to then compute the light reflected from the chosen surface to the viewer.

FIG. 21 illustrates an arbitrary polygon 2101. The environment around the polygon 2101 is represented by a hemisphere 2120 that has an illustrative partial section 2130. The hemisphere 2120 is divided into a number of sections, shown in the patch 2130 illustrated in FIG. 22. Each section represents the light sources or scene point of other elements surrounding the particular polygon 2101 in its position within the environment. The sections in the hemisphere are divided, for purposes of description into columns 2200 and rows 2210. Each point, defined by a row and a column, defines a color at that point on the environment map surrounding the polygon.

Environment mapping is particularly useful for reflection mapping. For example, if the polygon surface 2101 is a perfectly reflective surface, then its image will mirror that of the environment. In such instance, the environment map is mapped directly into the polygon and then to the image.

Implementation Examples of FIGS. 12–19

If the surface is not perfectly reflective, then special purpose calculations and hardware may be useful to implement environment mapping. Using our color representations, this reduces to performing a matrix multiply at each point. Recall that the light is given by an M-component vector, where M is the number of basis functions, and the surface is given by an L×M matrix, where L is the number of sensors. In this case, the environment map, because it stores illumination, will contain light vectors at each point. The light vectors are computed from the basis functions as described in reference to FIGS. 3–7.

Figure 12:
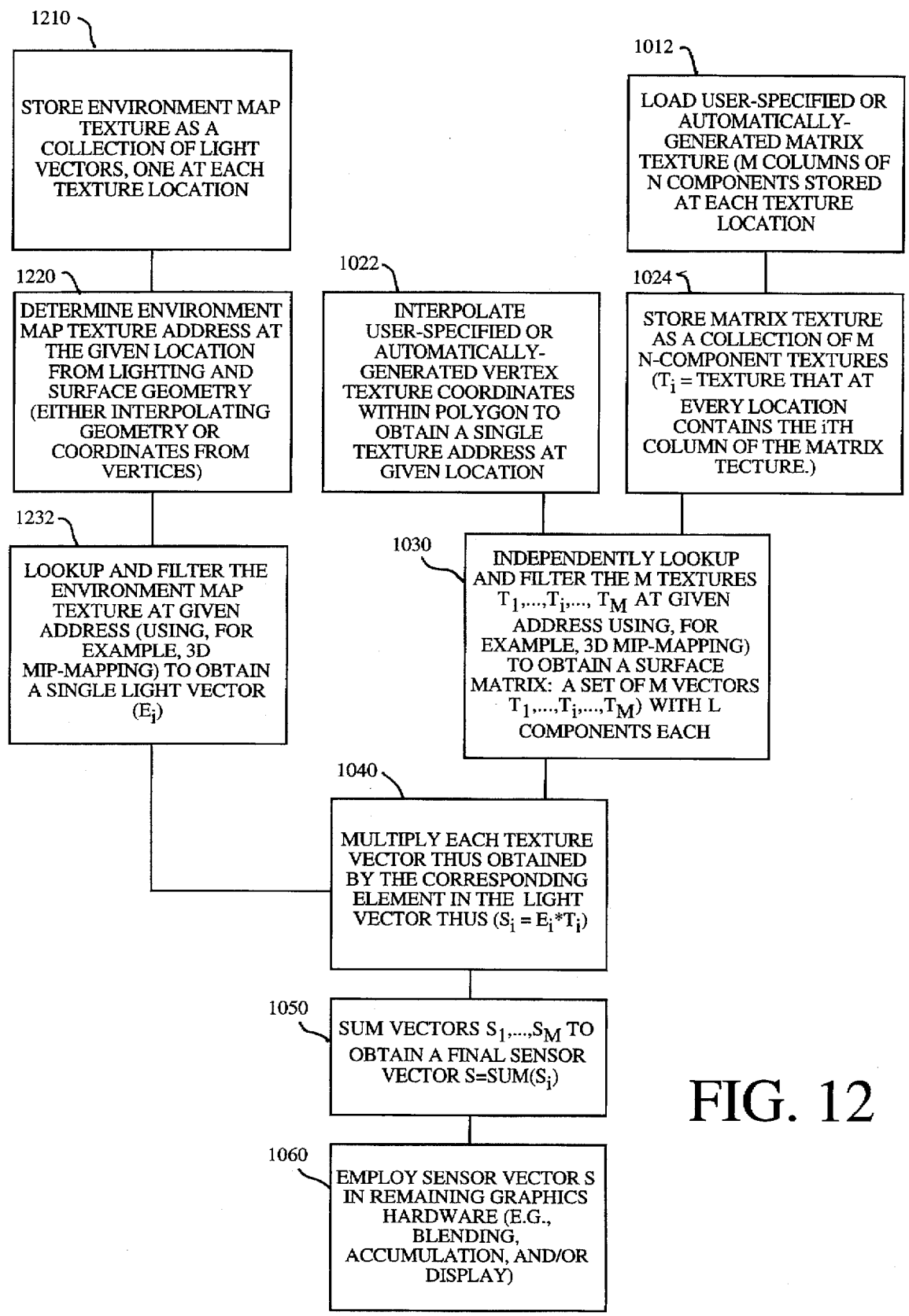
FIG. 12 is a flow chart illustrating environment mapping of matrix textures in a full spectral format.
Figure 13:
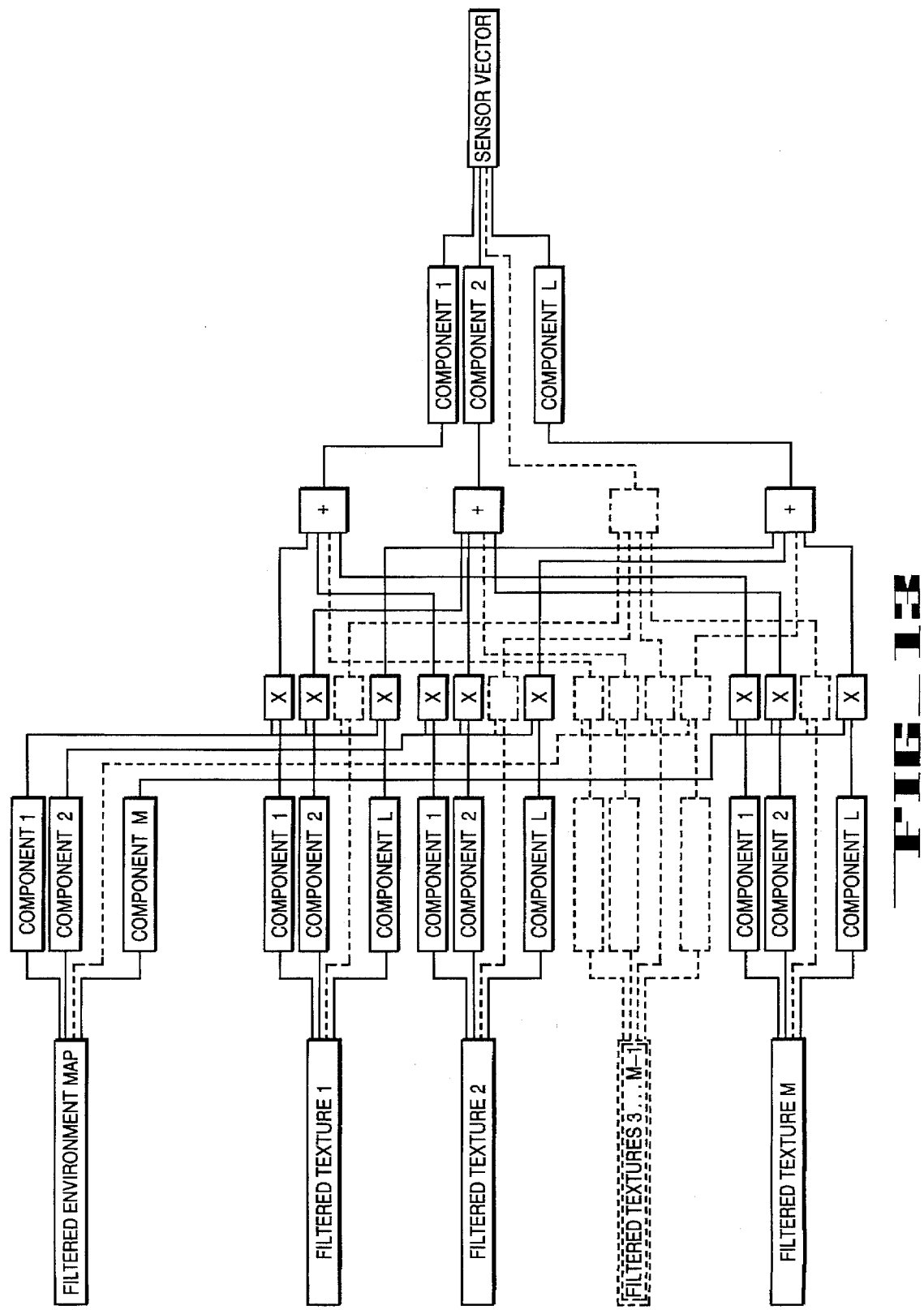
FIG. 13 is a hardware implementation of the system shown in FIG. 12.

The surface matrix may come from a variety of locations, and hence the circuitry may be different in different embodiments. Three exemplary implementations are shown in FIGS. 12–17 and discussed presently:

Reference is made to FIGS. 12 and 13. If the surface is defined as a full spectral texture, the implementation can use texture processing logic, such as that described in boxes 1012, 1022, 1024, and 1030 of FIGS. 10 and 11 to derive a surface matrix (in the form of M vectors with L components at 1030). At 1210, an environment map is stored as a collection of light vectors. The appropriate light vector is obtained at 1220 by determining the address in the environment map 1210 using conventional techniques at 1232. The address is used to lookup and filter the environment map to obtain a single light vector. At 1040, this light vector is processed like the interpolated light vector in FIGS. 10 and 11. Particularly, each component modulates the corresponding surface texture vector 1040; the resultant vectors are summed at 1050; and they are used for further processing or display at 1060. Circuitry to implement the matrix multiplication in the box 1040 of FIG. 12 is shown in FIG. 13 which uses circuitry similar to FIG. 11 but processes different inputs.

Figure 14:
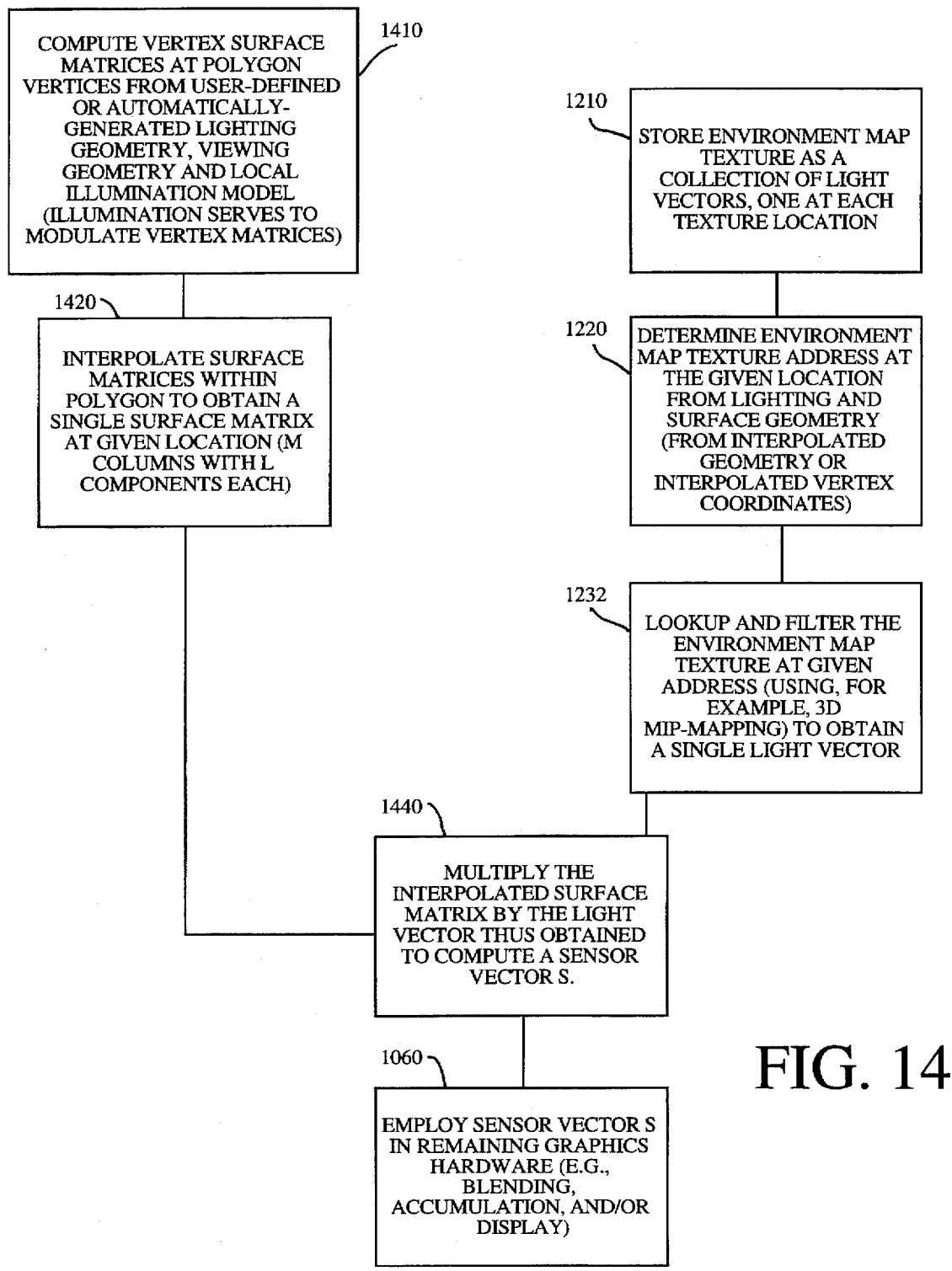
FIG. 14 is a flow chart illustrating environment mapping in which surface matrices are determined at the vertices and interpolated within a polygon before multiplying with an environment map vector.
Figure 15:
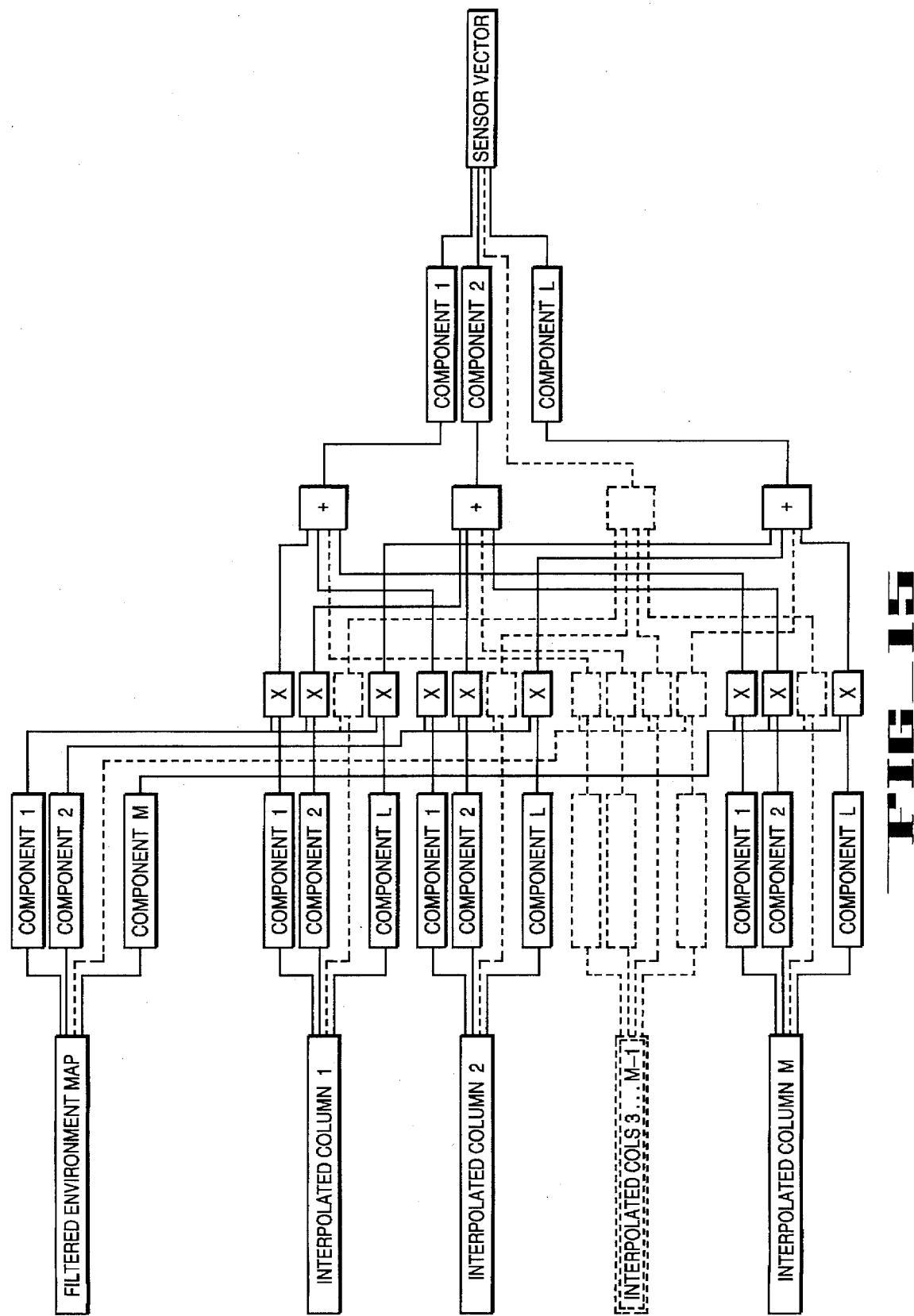
FIG. 15 is a hardware implementation of the system shown in FIG. 13.

Reference is made to FIGS. 14 and 15. At 1040, surface matrices are defined at each vertex of each polygon. At 1420, these matrices are interpolated to find a matrix at interior points. As discussed with reference to FIG. 12, the environment map is defined and used at 1210, 1220, and 1232 to obtain an appropriate light vector by determining the address in the environment map. Particularly, the address is used to lookup and filter the environment map 1232 to obtain a single light vector. At 1440, this light vector from 1232 is multiplied by the interpolated surface matrix from 1430 to determine a sensor vector that may then be used in further processing or display 1060. The circuitry to perform the matrix multiplication at 1440 is shown in FIG. 15.

Figure 16:
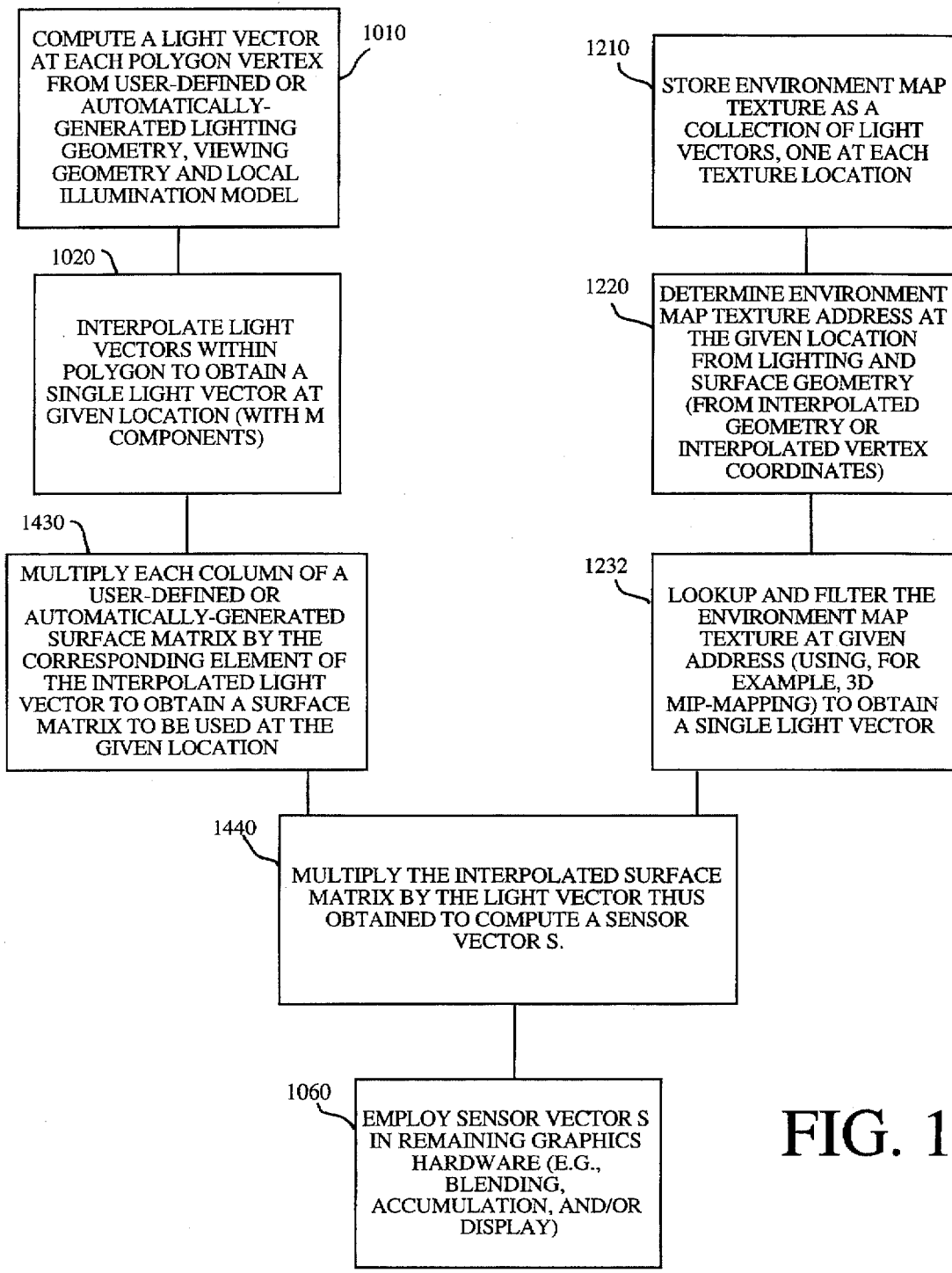
FIG. 16 is a flow chart illustrating an implementation in which the surface matrix is constant, but the illumination model modulates the matrix at each location by interpolating a vector from the vertices.
Figure 17:
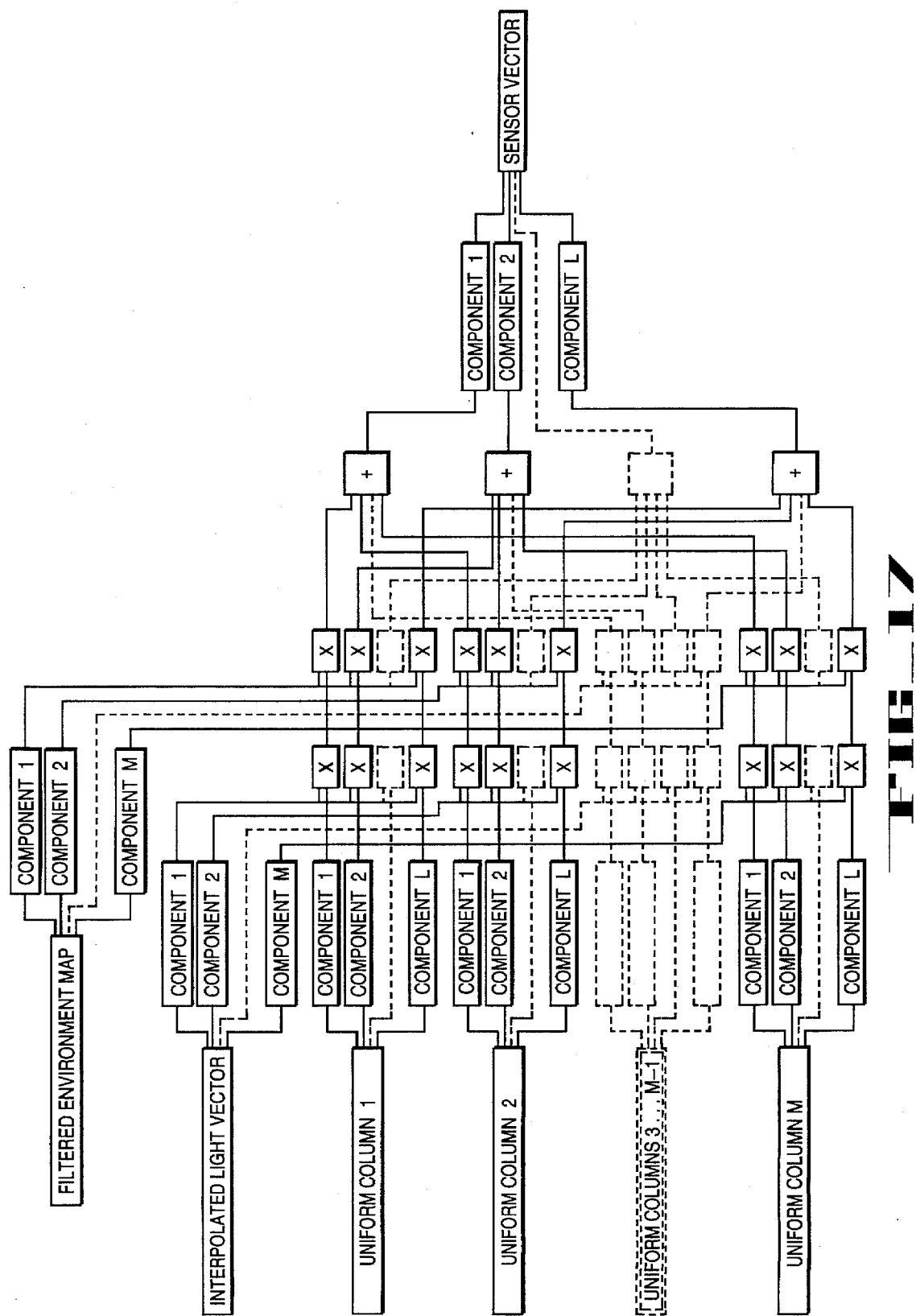
FIG. 17 is a hardware implementation of the system shown in FIG. 16.

Reference is made to FIGS. 16 and 17 to illustrate an implementation in which a constant surface matrix is defined over the entire polygon. In this case, a weighting factor in the form of an interpolated light vector be used to modulate the final results. This factor can be obtained by computing a vector at each vertex as in FIG. 10, and interpolating the vector at 1020 to interior points 1020. At 1430, each component of the light vector is multiplied by the corresponding column of the constant surface matrix to produce an interpolated surface matrix. On the other side of FIG. 16, the appropriate light vector is obtained by using the environment map techniques described with reference to FIG. 12, boxes 1210, 1220, and 1232 to store, lookup, and filter an environment map. Particularly, the address is used to lookup and filter the environment map 1232 to obtain a single light vector. At 1440, the light vector from 1232 is multiplied by the interpolated surface matrix from 1430 to determine a sensor vector that may then be used in further processing or display at 1060. Circuitry to perform the matrix multiplication at 1440 is shown in FIG. 17.

Figure 18:
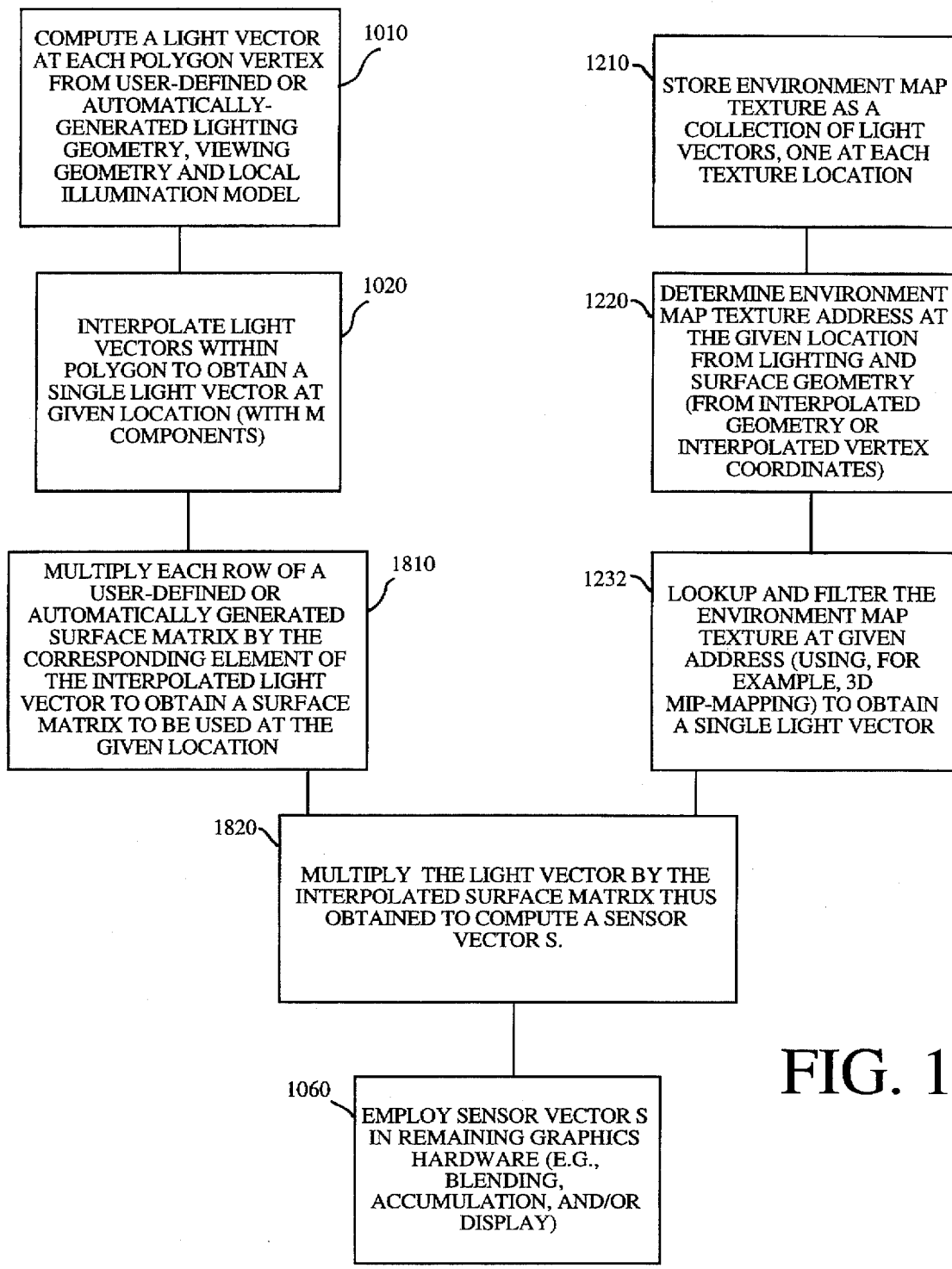
FIG. 18 is a flow chart of an implementation in which the surface matrix is constant and the illumination model modulates the matrix at each location by interpolating the vector from the vertices, however FIG. 18 multiplies the rows by the weighting vector whereas FIG. 16 multiplies the columns by the weighting vector.

It should be clear that the light vector may be used to modulate the constant surface matrix rows, instead of the columns if the number of basis functions equals the number of sensors. FIGS. 18 and 19 are examples of such an embodiment. Particularly, FIG. 18 provides the same result as the embodiment of FIG. 16. However in FIG. 18 at 1810, each row (rather than column) is used, and at 1820, matrix multiplication is implemented by multiplying the light vector by the interpolated surface matrix.

Appendix A, attached, is a thesis that discloses additional information relating to a full spectral rendering system.

An Implementation Example that Illustrates the Advantage of Three General Basis Functions Over RGB The color rendering system has been tested with a model of the Barcelona Pavilion originally designed by architect Ludwig Mies Vanderohe for the 1929 Worlds Fair and recently reconstructed for the 1992 Summer Olympics.

To demonstrate the flexibility in using a general set of basis functions, the user can interactively change the time of day. By changing the time of day, the user actually changes the spectral power distributions from both the disk of the sun and the ambient skylight. While in reality these differences can depend on weather conditions, geographical location, and many other factors, it has been shown that a reasonable approximation to the spectral power distribution of any phase of daylight can be obtained through the use of a small number of basis functions. The CIE has standardized a set of only three basis functions to describe all phases of daylight.

In addition to daylight, the scene was implemented to include artificial light within the pavilion. Consequently, the set of three basis functions was chosen to include the first two basis functions of the CIE daylight standard and the spectral power distribution of the artificial light.

As the time of day changes, the only changes are the coefficients of the ambient (skylight) and the infinite directional (direct sunlight) light sources to correctly handle the variation of spectral power distribution. This straightforward use of daylight is a distinct advantage of our color representations, particularly because daylight is widely used in synthetic images. In addition, fluorescent light presents problems for point sampling techniques, while it is handled naturally and exactly with our representations.

To summarize the performance results of the walkthrough of the Barcelona Pavilion, our system renders five thousand texture mapped polygons with eight attenuated directional light sources at thirty frames a second.

Conversion of Existing RGB Databases to Full Spectral Data, including Basis Function Determination Most existing color databases have an RGB format. For example, color texture maps are dominated by RGB images. Backwards compatibility with any RGB database can be provided in accordance with a method taught by A. S. Glassner, "How to Derive a Spectrum from an RGB Triplet," IEEE Computer Graphics and Applications, pp. 95–99, July 1989. Following is a brief description of the method described therein.

In order to obtain a full spectral description—for either an object's reflectance or a source's or spectral power distribution—the spectral curve can be constrained sufficiently to be described by a linear model with three components. To compute the RGB values, a matrix C is constructed with columns defined by the RGB values of the basis functions. The RGB color vector, which is in the database, is calculated by multiplying this matrix by the coefficient values. If the matrix is invertible, a unique transformation exists between the RGB values and the values of the coefficients. Thus, given a set of RGB values, the matrix can be inverted to obtain corresponding coefficients of the basis functions.

In the preferred embodiment, precisely three basis functions have been utilized because with any different number of basis functions, the transformation from RGB to full spectral data will not be unique. With three basis functions, the transformation is invertible, and therefore the mathematical approach given above does not depend on the chosen basis functions.

In one preferred implementation, the basis functions for the inversion matrix are given by the first three Fourier components over the visible range of wavelengths. This set is appropriate because many naturally occurring spectral functions are strongly band-limited. Alternatively, the set of basis functions could include three sharp cut-off functions. An approximation by such cut-off functions can be reasonable to specify colored light sources obtained when filters are placed over light sources. With either of these RGB conversion options, or with a user specified basis function, the function returns a full spectral curve when given an RGB triple, which can then be used for full spectral rendering.

From the above description, it will be apparent that the invention disclosed herein provides a novel and advantageous color rendering system for computer graphics. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. The following claims are indicative of the scope of the invention. All variations which come within the meaning and range of equivalency of the claims are to be embraced within their scope.

LIST OF VARIABLES $\lambda$: wavelength
i: used to signify a particular basis function i
$E_i(\lambda)$: basis function i (i=1 to i=M)
M: number of basis functions
i: used to signify a particular light (illumination) source j
$e_j$: light (spectral) vector for illumination source j
N: number of light sources
$S(\lambda)$: object reflectance function
$I(\lambda)$: light reflected from object
L: number of sensors (and associated sensor responses)
$\vec{v}_j$: sensor response vector for light source j
k: used to signify a particular sensor k
$R_k(\lambda)$: response of kth sensor
$x(\lambda)$: response of sensor x
X, Y, Z, ... : exemplary sensors

What is claimed is:

1. In a computer controlled graphics display system for displaying an object having an associated surface reflectance function to a plurality of sensors each having an associated sensor response function, a color processing method comprising the steps of:

(a) determining at a point on said object an illumination vector whose components represent the weights of predetermined basis functions for a predetermined light source;

(b) determining a surface matrix responsive to a surface reflectance function at said point, said plurality of predetermined basis functions, and said plurality of sensor response functions wherein each entry in said surface matrix has a value representing $\int X_c(\lambda) s(\lambda) E_i(\lambda) d\lambda$, which represents a color component for an ith basis function of said plurality of predetermined basis functions, wherein $s(\lambda)$ represents said surface reflectance function, $\lambda$ represents wavelength, $X_c(\lambda)$ represents one of said plurality of sensor response functions and $E_i(\lambda)$ represents one of said plurality of predetermined basis functions for said ith basis function;

(c) determining a set of colorimetric sensor sensor values at said point including multiplying in a matrix multiplication circuit said surface matrix by said illumination vector, and displaying a picture element on a display responsive to said set of colorimetric sensor sensor values.

2. A method as in claim 1 for vertex illumination processing wherein said point is a vertex of a polygon which is used to render said image.

3. A method as in claim 1 wherein said step a further comprises:

a1) supplying an environment map having a plurality of locations each defined by an environment map vector that represents illumination data at said plurality of locations in full spectral representation;

a2) determining a location in said environment map responsive to said point; and a3) determining said illumination vector by retrieving an environment map vector at said location determined in said previous step.

4. A method as in claim 1 wherein said step b further comprises:
- b1) supplying a texture map having a plurality of texels each defining a surface reflectance function in full spectral representation;
- b2) determining a texture surface matrix at each texel responsive to said surface reflectance function at said respective texel, said plurality of predetermined basis functions, and said plurality of predetermined sensor responses; and
- b3) associating said point with a texture surface matrix so that said texture surface matrix defines said surface matrix for subsequent operations.

5. A method as in claim 1 wherein said step b further comprises:
- b1) supplying a texture map having a plurality of texels each having a texture surface matrix predetermined responsive to said surface reflectance function at said respective texel, said plurality of predetermined basis functions, and said plurality of sensor responses; and
- b3) associating said point with a texture surface matrix so that said texture surface matrix defines said surface matrix for subsequent operations.

6. A method as in claim 1 further comprising the steps of:
- d) supplying a texture map having a plurality of texels each defining a surface reflectance function in full spectral representation;
- e) determining a texture surface matrix at each texel responsive to said surface reflectance function at said respective texel, said plurality of predetermined basis functions, and said plurality of predetermined sensor responses; and
- f) associating said point with a texture surface matrix; and
- g) determining textured colorimetric sensor values responsive to said texture surface matrix from said previous step and said set of colorimetric sensor values from step c.

7. A method as in claim 1 further comprising the steps of:
- d) supplying a texture map having a plurality of texels each having a texture surface matrix predetermined responsive to a surface reflectance function at said respective texel, said plurality of predetermined basis functions, and said plurality of predetermined sensor responses; and
- f) associating said point with a texture surface matrix; and
- g) determining a set of textured colorimetric sensor values responsive to said texture surface matrix from said previous step and said set of colorimetric sensor values from step c.

8. A method as in claim 7 wherein said point is a vertex of a polygon which is used to render said image using vertex illumination and wherein said texture surface matrix is applied to said polygon.

9. In a computer controlled graphics display system for displaying an object having a surface reflectance function associated therewith under illumination by at least one light source having a predetermined spectral content, to a plurality of sensors each having a sensor response function, a color processing circuit comprising:

- a light source receiving circuit to receive a light vector whose components represent said light source by respective weights of each of a plurality of predetermined basis functions;
- a surface matrix receiving circuit coupled to receive a surface matrix precomputed responsive to said surface reflectance function, said predetermined basis functions, and said sensor response functions wherein each entry in said surface matrix has a value representing $\int X_c(\lambda) s(\lambda) E_i(\lambda) d\lambda$, which represents a color component for an ith basis function of said plurality of predetermined basis functions, wherein $s(\lambda)$ represents said surface reflectance function, $\lambda$ represents wavelength, $X_c(\lambda)$ represents one of said plurality of sensor response functions and $E_i(\lambda)$ represents one of said plurality of predetermined basis functions for said ith basis function;
- a matrix multiplication circuit coupled to receive and multiply said surface matrix and said light vector to compute a set of colorimetric sensor values for said picture element.

10. The color processing circuit of claim 9 further comprising:
- a vertex illumination geometry processing circuit coupled to receive geometry information associated with said object and said light source, and for processing said geometry information to provide a vertex and a light vector associated therewith which is supplied to said light source receiving circuit.

11. The color processing circuit of claim 9 further comprising a display device coupled to said matrix multiplication circuit for displaying said picture element responsive to said set of colorimetric sensor values.

12. The color processing circuit of claim 9 further comprising:
- a surface reflectance function receiving circuit coupled to receive a full spectral surface reflection function;
- a basis function receiving circuit coupled to receive said predetermined basis functions;
- a sensor response receiving circuit coupled to receive said sensor responses; and
- a surface matrix computation circuit coupled to said surface reflectance function receiving circuit, said basis function receiving circuit, and said sensor response receiving circuit, for computing a surface matrix responsive thereto that is supplied to said surface matrix receiving circuit.

13. The color processing circuit of claim 9 further comprising:
- a texture map receiving circuit coupled to receive a texture map having a plurality of texels each having a texture surface matrix predetermined responsive to a surface reflectance function at said respective texel, said plurality of predetermined basis functions, and said plurality of predetermined sensor responses; and
- a texturing circuit for receiving said texture map and associating a texture surface matrix with said point on said object, and supplying the resultant texture surface matrix to said surface matrix receiving circuit.

14. The color processing circuit of claim 9 further comprising:
- a environment map receiving circuit coupled to receive an environment map having a plurality of locations each defined by an environment map vector that represents illumination data at said plurality of locations in full spectral representation; and
- a processing circuit for receiving said environment map and associating an environment map vector with said point on said object, and supplying the resultant environment map vector to said illumination vector receiving circuit.

15. In a computer controlled graphics display system for displaying an object having an associated surface reflectance function to a plurality of sensors each having an associated sensor response function, said object being illuminated by a plurality of light sources, a color processing method comprising the steps of:

(a) for each of said plurality of light sources, determining an illumination vector whose components represent the weights of predetermined basis functions;

(b) determining at a point on said object a surface matrix responsive to a surface reflectance function, said plurality of predetermined basis functions, and said plurality of sensor response functions wherein each entry in said surface matrix has a value representing $\int X_c(\lambda) s(\lambda) E_i(\lambda) d\lambda$, which represents a color component for an ith basis function of said plurality of predetermined basis functions, wherein $s(\lambda)$ represents said surface reflectance function, $\lambda$ represents wavelength, $X_c(\lambda)$ represents one of said plurality of sensor response functions and $E_i(\lambda)$ represents one of said plurality of predetermined basis functions for said ith basis function;

(c) responsive to said surface matrix and each of said illumination vectors, determining a set of colorimetric sensor values for each of said illumination vectors, including the step of multiplying said surface matrix by each illumination vector to provide a set of colorimetric sensor-basis values for each illumination vector;

(d) responsive to each of said sets of colorimetric sensor-basis values, determining a final set of colorimetric sensor values; and (e) supplying said final set for display.

16. A color processing method as in claim 15 wherein said step d includes adding said colorimetric sensor vectors for each light source to provide a final colorimetric sensor vector.

17. A color processing method as in claim 15 wherein said step a comprises the step of selecting said plurality of light sources, each having a full spectral function associated therewith, and transforming said spectral functions into a plurality of illumination vectors whose components represent the weights of predetermined basis functions.

18. A full spectral texturing method for processing an image for display on a data processing system, comprising the steps of:

(a) determining at a point on an object an illumination vector representative of a light source in full spectral representation;

(b) determining at said point a full spectral texture representation;

(c) determining a set of colorimetric sensor values at said point responsive to said illumination vector and said full spectral texture representation and displaying a picture element on a display responsive to said set of colorimetric sensor values (d) determining a texture surface matrix at each point in said texture map responsive to said surface reflectance function at said respective texel, said plurality of predetermined basis functions, and a plurality of sensor response functions; and (e) computing said set of colorimetric sensor values responsive to said texture surface matrix and said illumination vector wherein each entry in said texture surface matrix has a value representing $\int X_c(\lambda) s(\lambda) E_i(\lambda) d\lambda$, which represents a color component for an ith basis function of said plurality of predetermined basis functions, wherein $s(\lambda)$ represents said surface reflectance function, $\lambda$ represents wavelength, $X_c(\lambda)$ represents one of said plurality of sensor response functions and $E_i(\lambda)$ represents one of said plurality of predetermined basis functions for said ith basis function.

19. A method as in claim 18 wherein said point is a vertex of a polygon which is used to render said image.

20. A method as in claim 18 wherein said full spectral texture representation comprises a texture map having a full spectral surface reflectance function at each texel, and further comprising the steps of:

determining a texture surface matrix at each point in said texture map responsive to said surface reflectance function at said respective texel, said plurality of predetermined basis functions, and a plurality of sensor responses; and computing said set of colorimetric sensor values responsive to said texture surface matrix and said illumination vector.

21. A method as in claim 18 wherein said full spectral texture representation comprises a texture map having a full spectral surface reflectance function at each texel, and further comprising the steps of:

determining a texture surface matrix at each point in said texture map responsive to said surface reflectance function at said respective texel, said plurality of predetermined basis functions, and a plurality of sensor responses; and computing said a textured set of colorimetric sensor values responsive to said texture surface matrix and said set of colorimetric sensor values computed in step c.

22. An environment mapping method for processing an image for display on a data processing system, said method comprising the steps of:

(a) supplying an environment map having a plurality of locations each defined by an environment map vector that represents illumination data in full spectral representation;

(b) determining at a point on an object a full spectral representation of a reflectance of said object from said point, including a surface matrix;

(C) determining a location in said environment map corresponding to said point;

(d) responsive to said location, determining an illumination vector representing a light source in full spectral representation;

(e) determining a colorimetric sensor value for said point responsive to said illumination vector and said full spectral representation of a reflectance, multiplying said surface matrix by said illumination vector in a matrix multiplication circuit, and displaying a picture element on a display responsive to said colorimetric sensor value wherein each entry in said surface matrix has a value representing $\int X_c(\lambda) s(\lambda) E_i(\lambda) d\lambda$, which represents a color component for an ith basis function of said plurality of predetermined basis functions, wherein $s(\lambda)$ represents said surface reflectance function, $\lambda$ represents wavelength, $X_c(\lambda)$ represents one of said plurality of sensor response functions and $E_i(\lambda)$ represents one of said plurality of predetermined basis functions for said ith basis function.

23. The method of claim 22 wherein said surface matrix includes values determined responsive to a plurality of predetermined basis functions and a plurality of predetermined sensor responses.

24. The method of claim 22 further comprising the step of determining a surface reflectance matrix responsive to said full spectral representation of a reflectance, a plurality of predetermined basis functions, and a plurality of predetermined sensor response functions.

25. A method as in claim 22 wherein said display is coupled to said data processing system.

26. A method as in claim 25 wherein said environment map is stored in a memory in said data processing system, and wherein said illumination vector is stored in said memory.

27. A method as in claim 26 wherein said point is a vertex of a polygon.

28. A method as in claim 27 wherein components of said illumination vector define the weights of a plurality of predetermined basis functions.

29. A color rendering system for a computer graphics station having a color monitor that displays a color image responsive to input RGB values that define one or more objects illuminated by one or more sources, said color rendering system comprising:

a first memory element for storing a full spectral reflectance function representation $S(\lambda)$ for each object in said color image;

a second memory element for storing illumination data representative of the spectral distribution of each of said sources as a function of wavelength $\lambda$ for each illumination source j in said color image;

a basis determination circuit, coupled to receive said illumination data, and responsive thereto, for transforming the representation of said illumination data into a linear combination of basis functions as a function of wavelength $\lambda$, each basis function from i=1 to i=M being represented by $E_i(\lambda)$;

a third memory element for storing a plurality of sensor functions, including $x(\lambda)$, $y(\lambda)$, and $z(\lambda)$;

an integration circuit coupled to said first and third memory elements for integrating for each object over the wavelength ($\lambda$), the reflectance function $S(\lambda)$, each of the basis functions $E_i(\lambda)$ corresponding to the illumination sources, and the chromaticity basis functions to define a XYZ vector for each basis function i substantially in accordance with the following formulas:

$$X_i = \int x(\lambda) E_i(\lambda) S(\lambda) d\lambda,$$

$$Y_i = \int y(\lambda) E_i(\lambda) S(\lambda) d\lambda,$$

and $$Z_i = \int z(\lambda) E_i(\lambda) S(\lambda) d\lambda$$

for each basis function i=1 through i=M to define a 3×M XYZ matrix having columns defined by said XYZ vectors for each of said M basis functions; and graphics display circuitry coupled to receive the XYZ matrix and to said second memory element, to compute XYZ data and supply said XYZ data to said color monitor.

* * * * *

UNITED STATES PATENT AND TRADEMARK OFFICE
CERTIFICATE OF CORRECTION

PATENT NO. : 5,710,876
DATED : January 20, 1998
INVENTOR(S) : Peercy et al.

It is certified that error appears in the above-identified patent and that said Letters Patent is hereby corrected as shown below:

On the title page item [73] insert the following -- insert--Board of Trustees of the Leland Stanford Junior University, Stanford, Calif.--

Signed and Sealed this

Thirteenth Day of July, 1999

Attest:

Q. TODD DICKINSON

Attesting Officer

Acting Commissioner of Patents and Trademarks